(12) United States Patent
Matsukubo et al.

(10) Patent No.: US 7,142,717 B2
(45) Date of Patent: Nov. 28, 2006

(54) IMAGE PROCESSING APPARATUS AND METHOD

(75) Inventors: Yushi Matsukubo, Kanagawa (JP); Hiroyuki Tsuji, Kanagawa (JP); Yukihiko Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 10/915,090

(22) Filed: Aug. 9, 2004

(65) Prior Publication Data
US 2005/0007611 A1    Jan. 13, 2005

Related U.S. Application Data

(62) Division of application No. 10/270,511, filed on Oct. 16, 2002, now abandoned, which is a division of application No. 09/131,657, filed on Aug. 10, 1998, now Pat. No. 6,504,949.

(30) Foreign Application Priority Data

| Aug. 19, 1997 | (JP) | ................................ 9-222830 |
| Aug. 19, 1997 | (JP) | ................................ 9-222831 |
| Jul. 16, 1998 | (JP) | ............................... 10-202248 |

(51) Int. Cl.
*G06K 9/46* (2006.01)
*G06K 9/66* (2006.01)

(52) U.S. Cl. .................. 382/190; 382/162; 382/299; 382/300; 358/1.9

(58) Field of Classification Search ........... 382/162, 382/190, 264, 299, 300; 358/1.2, 1.9, 3.01, 358/3.06, 3.1, 3.12, 515, 525
See application file for complete search history.

(56) References Cited

U.S. PATENT DOCUMENTS

| 5,282,057 A | 1/1994 | Maillous et al. ............ 358/445 |
| 5,357,353 A | 10/1994 | Hirota ........................ 358/530 |
| 5,502,576 A * | 3/1996 | Ramsay et al. ............. 358/444 |
| 5,751,929 A | 5/1998 | Ohnuma et al. ............ 395/129 |

(Continued)

FOREIGN PATENT DOCUMENTS

EP    0 695 079    1/1996

OTHER PUBLICATIONS

Patent Abstracts of Japan, vol. 1996, No. 12, Dec. 26, 1996 & JP 08 214149, Aug. 20, 1996.

*Primary Examiner*—Phuoc Tran
(74) *Attorney, Agent, or Firm*—Fitzpatrick, Cella, Harper & Scinto

(57) ABSTRACT

By smoothing a full-color image, staircasing of characters even in a gradation image is removed. An area to be smoothed is detected from image data having a plurality of color components, and image data included in the detected area is smoothed in units of color components.

Image data which places an importance on resolution is smoothed by increasing the resolution to reproduce smooth characters and figures. Image data which places an importance on gradation characteristic is output without increasing the resolution, thus attaining high-gradation recording. A character or figure is detected from bitmap image data input from external equipment, and is smoothed. In correspondence with the density of the smoothed image data, the pulse width is switched, thereby changing the resolution of image data.

24 Claims, 37 Drawing Sheets

U.S. PATENT DOCUMENTS

| | | | |
|---|---|---|---|
| 5,875,044 A | 2/1999 | Seto et al. | 358/518 |
| 5,909,505 A | 6/1999 | Katayama et al. | 382/164 |
| 5,946,416 A | 8/1999 | Akagi et al. | 382/202 |
| 5,956,470 A | 9/1999 | Eschbach | 395/109 |
| 6,061,151 A | 5/2000 | Ono | 358/448 |
| 6,118,895 A | 9/2000 | Hirota et al. | 382/165 |
| 6,449,060 B1 | 9/2002 | Kawai et al. | 358/1.9 |

* cited by examiner

MAIN SCANNING DIRECTION

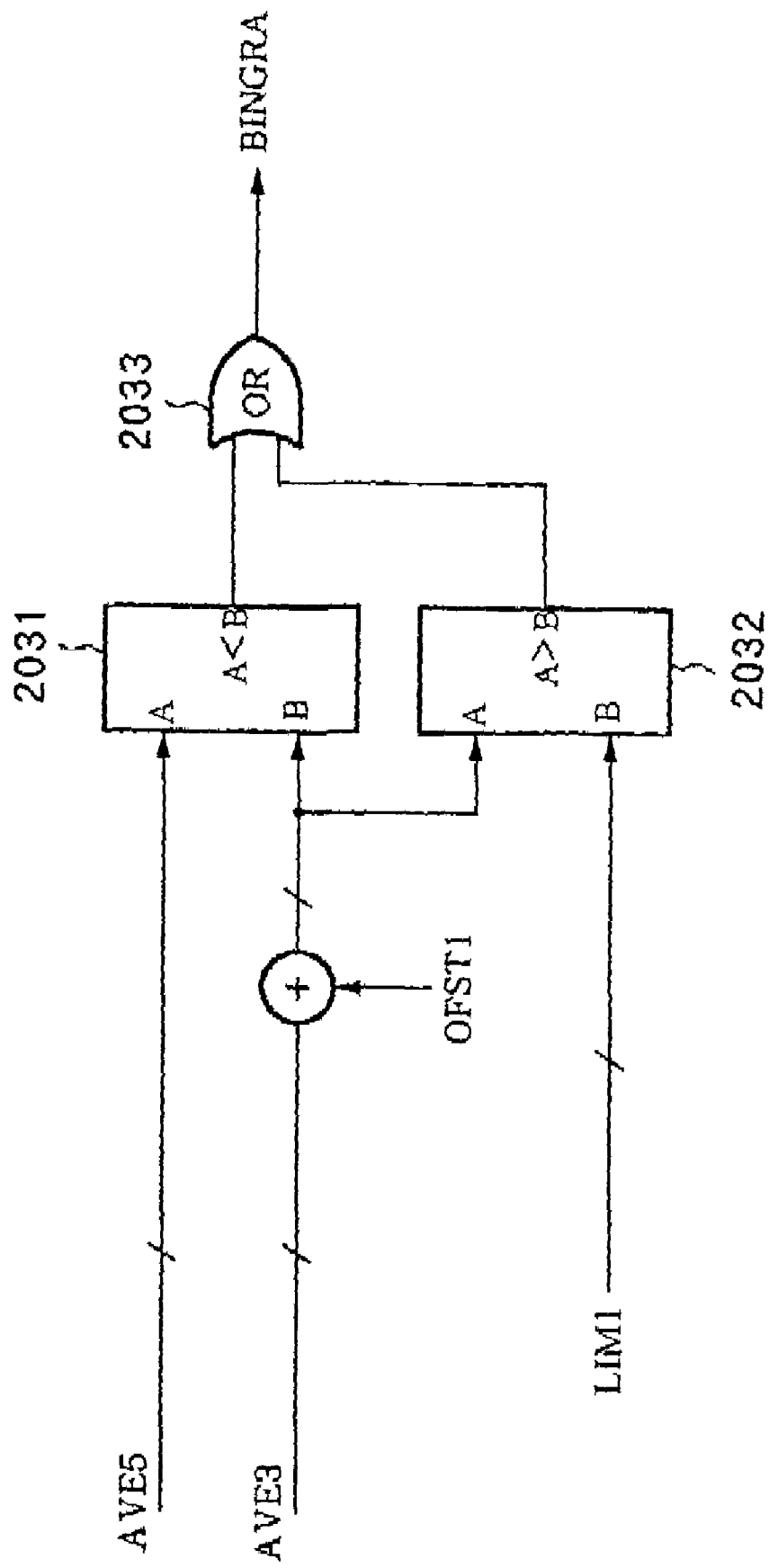

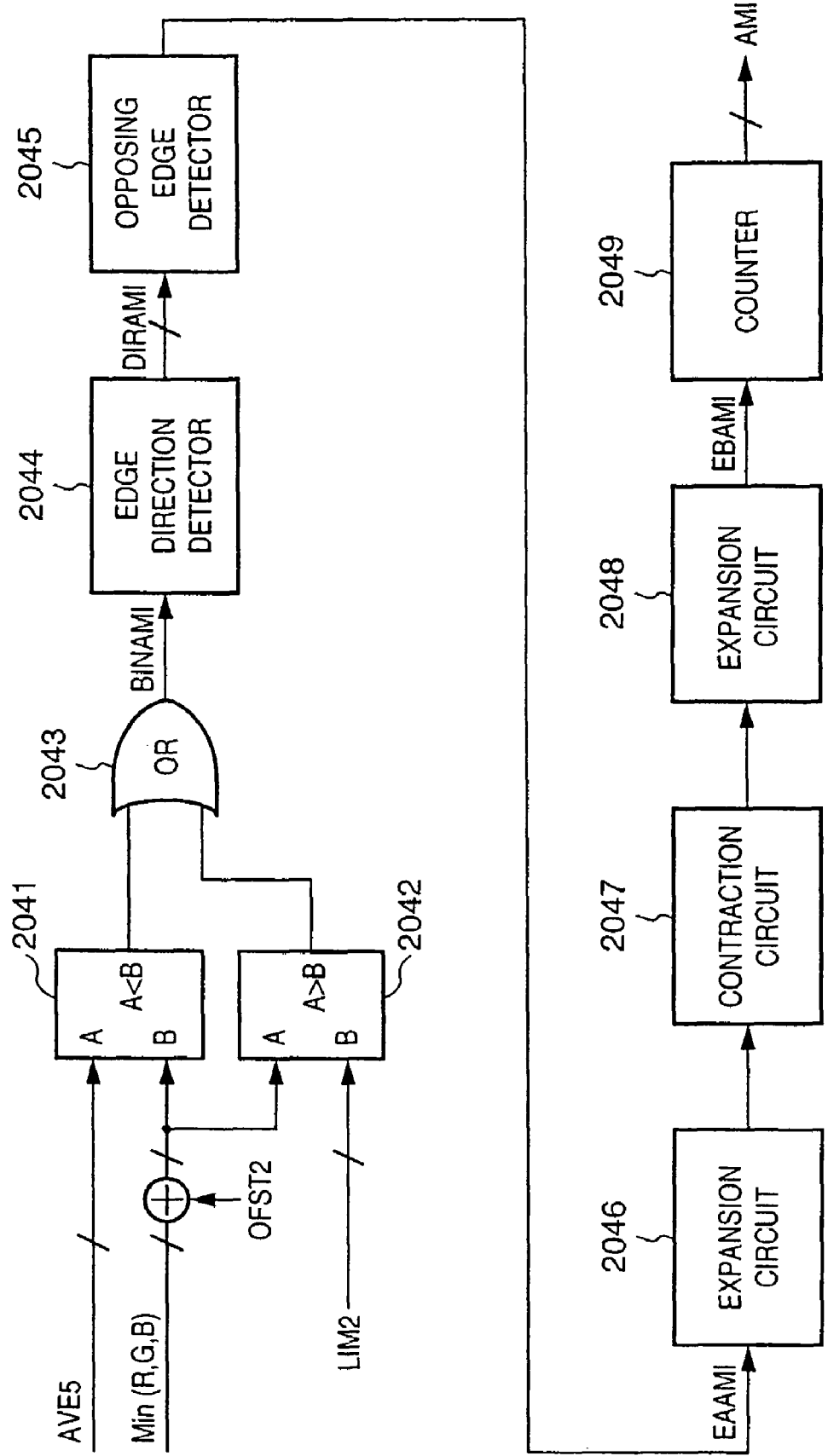

FIG. 13A

| X | 1 | X |
|---|---|---|
| X | X | X |
| X | 0 | X |

SET BIT 0 OF DIRAMI AT "1"

"X" ARE INDEFINITE

FIG. 13B

| X | X | X |
|---|---|---|
| 0 | X | 1 |
| X | X | X |

SET BIT 1 OF DIRAMI AT "1"

"X" ARE INDEFINITE

FIG. 13C

| X | 1 | X |
|---|---|---|
| X | X | X |
| X | 0 | X |

SET BIT 2 OF DIRAMI AT "1"

"X" ARE INDEFINITE

FIG. 13D

| X | 0 | X |
|---|---|---|
| X | X | X |
| X | 1 | X |

SET BIT 3 OF DIRAMI AT "1"

"X" ARE INDEFINITE

FIG. 14

| A11 | A21 | A31 | A41 | A51 |
|-----|-----|-----|-----|-----|
| A12 | A22 | A32 | A42 | A52 |
| A13 | A23 | A33 | A43 | A53 |
| A14 | A24 | A34 | A44 | A54 |
| A15 | A25 | A35 | A45 | A55 |

DIRAMI VALUES OF PIXELS
AROUND PIXEL OF INTEREST

FIG. 18

| PICH_FH | | | | | | | ZONE_P |
|---|---|---|---|---|---|---|---|
| 0 | 1 | 2 | 3 | 4 | 5 | 6 | |
| 1 | 1 | 1 | 1 | 1 | 1 | 1 | 7 |
| 1 | 1 | 1 | 1 | 1 | 1 | 0 | 6 |
| 1 | 1 | 1 | 1 | 1 | 0 | 0 | 5 |
| 1 | 1 | 1 | 1 | 0 | 0 | 0 | 4 |
| 1 | 1 | 1 | 0 | 0 | 0 | 0 | 3 |
| 1 | 1 | 0 | 0 | 0 | 0 | 0 | 2 |
| 1 | 0 | 0 | 0 | 0 | 0 | 0 | 1 |
| 0 | 0 | 0 | 0 | 0 | 0 | 0 | 0 |

FIG. 26
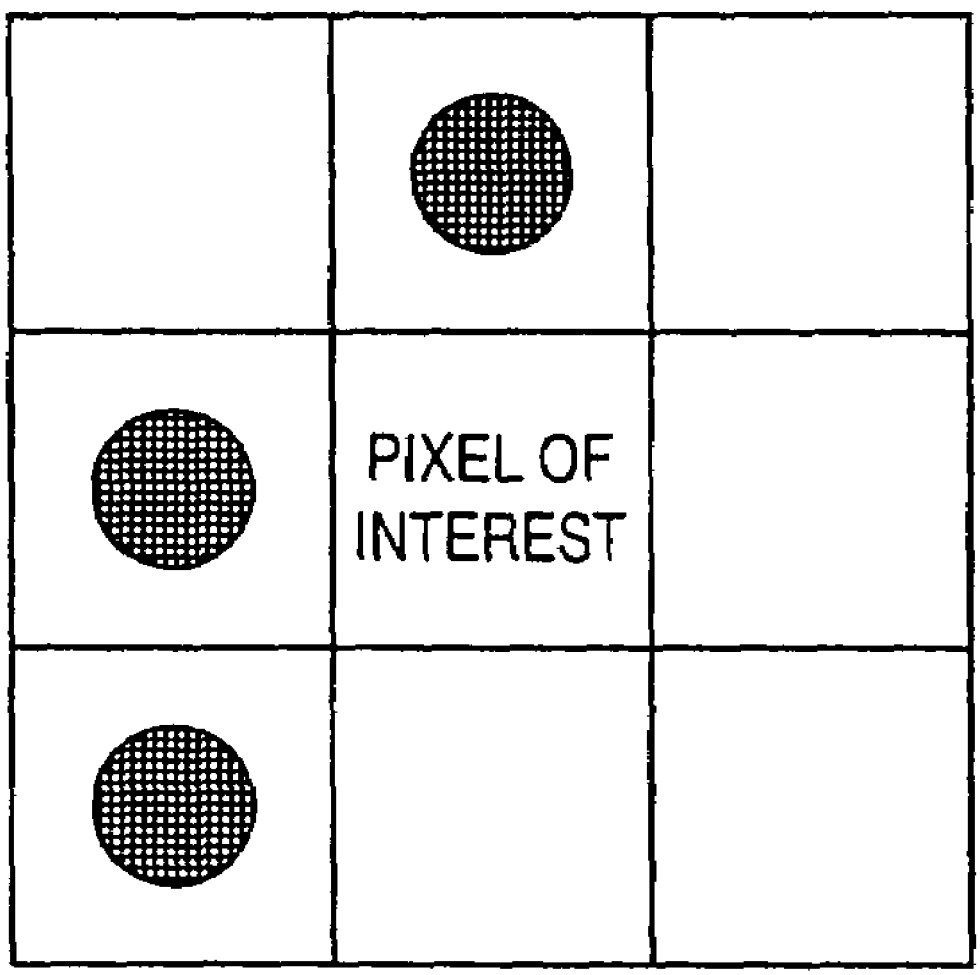
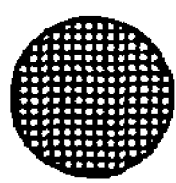 → PRESENCE OF DATA DENSITY 51

FIG. 29A
IMAGE MEMORY
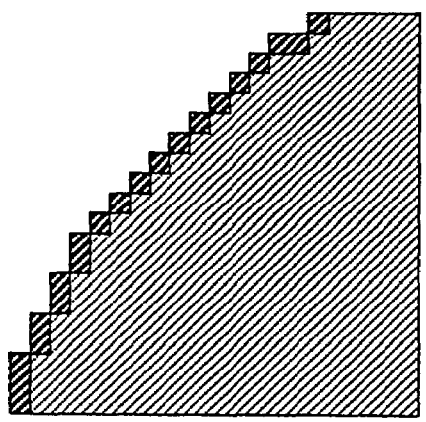
FIG. 29B
ATTRIBUTE MAP MEMORY
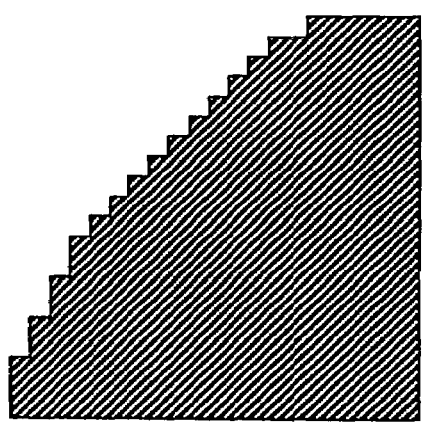
VECTOR FLAG
FIG. 29C
NONE
CHARACTER FLAG
FIG. 29D
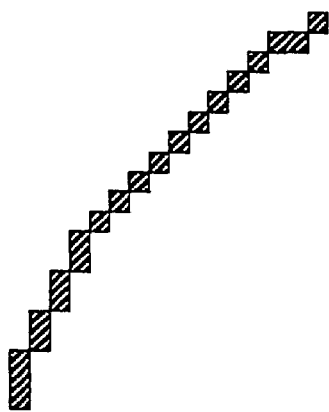
EDGE FLAG
FIG. 29E
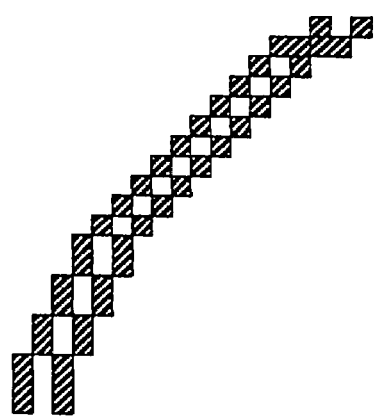
EDGE BOUNDARY FLAG

IMAGE MEMORY

ATTRIBUTE MAP MEMORY

VECTOR FLAG

CHARACTER FLAG

EDGE FLAG

EDGE BOUNDARY FLAG

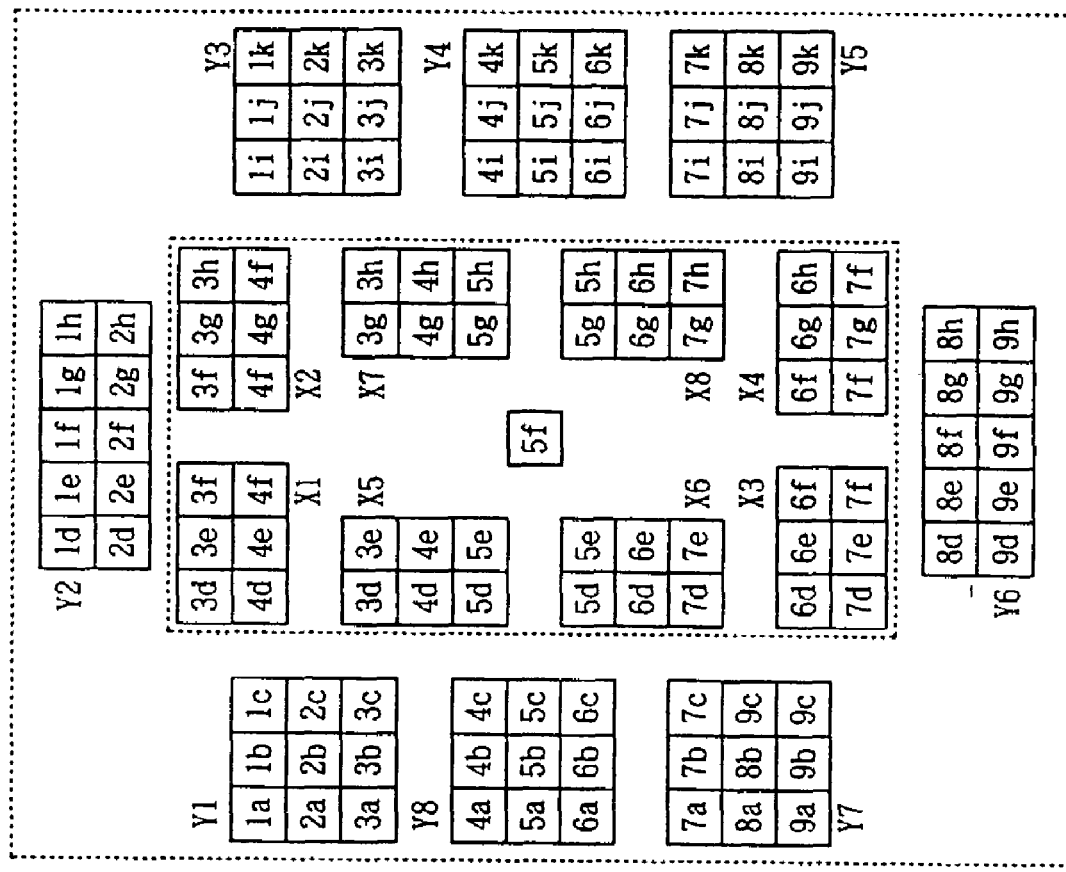
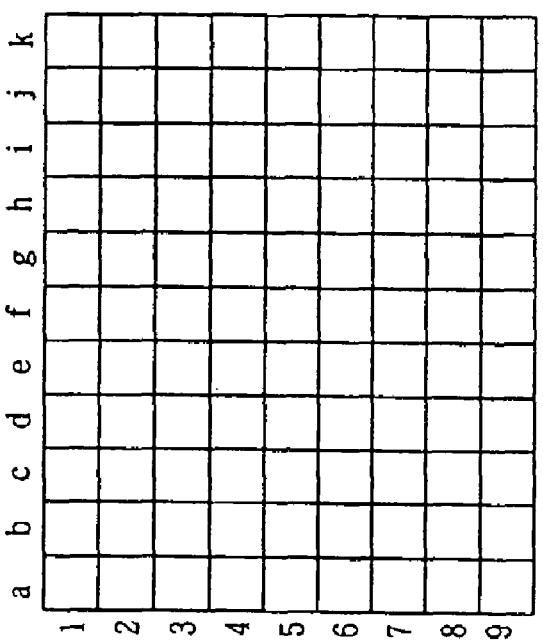
FIG. 35B
FIG. 35A

FIG. 38

INPUT STEP MODULE

DETECTION STEP MODULE

SMOOTHING STEP MODULE

OUTPUT STEP MODULE

SWITCHING STEP MODULE

IMAGE PROCESSING APPARATUS AND METHOD

This application is a divisional application of U.S. application Ser. No. 10/270,511, filed Oct. 16, 2002, now abandoned, which was a divisional application of U.S. application Ser. No. 09/131,657, filed Aug. 10, 1998, which issued as U.S. Pat. No. 6,504,949 on Jan. 7, 2003.

BACKGROUND OF THE INVENTION

1. Field of the Invention

The present invention relates to an image processing apparatus and method and, more particularly, to an image processing apparatus and method, which extract an image feature portion from color image data electrically read based on an original image or color image data created by a computer, and process color image data to be output to, e.g., a printer on the basis of the extraction result.

The present invention relates to an image processing apparatus and method and, more particularly, to an image processing apparatus and method, which smoothes a bit map image data showing character and figure output by external equipment.

2. Description of Related Art

In recent years, a color printer apparatus which obtains color images by outputting digitally processed color image data, and a color image printing system such as a so-called digital color copying machine, and the like, which color-separates and electrically reads a color original image, and obtains a copy of a color image by printing out the read color image data onto a recording paper sheet have evolved remarkably. As such apparatuses prevail, requirements for image quality of color images are becoming stricter, and especially, requirements for printing black characters and lines more clearly and sharply are becoming stricter. More specifically, when a black original image is color-separated, yellow, magenta, cyan, and black signals are generated as those for reproducing black. When printing is done directly based on the obtained signals, since black is reproduced by superposing these four colors, a black thin line produces smear due to slight misregistration among the colors. As a result, black does not appear black or is blurred, thus considerably deteriorating the print quality.

On the other hand, in one method, information associated with black, color information associated with colors, and feature data of the spatial frequencies of thin lines, dot patterns, and the like are extracted from an image signal representing an image to be processed to detect, e.g., areas for black characters, color characters, and the like, and to also detect areas for a halftone image, dot pattern image, and the like, and image processing suitable for each detected area is done so as to express, e.g., black characters using black alone. Also, in another method proposed, a plurality of different thicknesses of characters and lines can be discriminated, and the color amount of black is adjusted or character and dot pattern edges are separately detected in accordance with the thicknesses of characters to execute different image processing operations for character edges in a dot pattern/halftone image or white background, thus attaining smooth black character processing. However, even after image area separation, since a printer having a resolution of about 400 dpi has a dot spacing of 63.5 microns, character and figure edges formed by dots look shaggy with the visual sense of a human being, that can distinguish up to about 20 microns, and the print quality is not so high.

In order to improve the print quality, a system shown in FIG. 32 is known. In this conventional system, a page layout document for DTP, wordprocessing or graphic document, or the like is created using a host computer 1310, and is printed out by a color printer (laser beam printer) via a raster image processor 1313. Reference numeral 1311 denotes an application program running on the host computer 1310, and for example, wordprocessing software such as "Word" (trademark) available from Microsoft Corporation, page layout software such as PageMarker (trademark) available from Adobe Corporation, and the like, are popularly used. A digital document created by such software is sent to a printer driver 1312 via an operating system (OS; not shown) of the computer. This digital document is normally a set of command data that represent figures, characters, and the like in one page, and these commands are sent to the printer driver 1312. The commands are expressed as a language system called a PDL (page description language), and GDI (trademark), PS (PostScript: trademark), and the like are typical PDLs. The printer driver 1312 transfers PDL commands output from the application 1311 to a rasterizer 1314 in the raster image processor 1313. The rasterizer 1314 maps characters, figures, and the like expressed by the PDL commands to an actual two-dimensional bitmap image to be printed out. The rasterizer 1314 uses a frame as a two-dimensional plane, and forms the bitmap image over the entire frame by one-dimensionally repetitively scanning (rasterizing) in units of lines. The bitmap image mapped by the rasterizer 1314 is temporarily stored in an image memory 1315.

A document image displayed on the host computer 1310 is sent as PDL commands to the rasterizer 1314 via the printer driver 1312, and the rasterizer 1314 maps a two-dimensional bitmap image onto the image memory 1315. The mapped image data is sent to a color printer 1318. The color printer 1318 mounts a known electrophotographic image forming unit 1319, which prints out the image data by forming a visible image on a recording paper sheet. The image data in the image memory 1315 is transferred in synchronism with sync signals and clock signals required for operating the image forming unit 1319, or a specific color component signal, its request signal, and the like.

Smoothing is known as a technique for improving the print quality by removing shagginess or staircasing of character and line image edges. However, no conventional method of satisfactorily smoothing multi-color, multi-valued image data is available.

When full-color image data transferred from an external equipment includes both character and picture data, its image quality can be further improved using an adaptive processing circuit which is mounted on, e.g., a color copying machine or the like. However, character areas cannot always be detected 100% by image area separation, and may be erroneously detected in a natural image area, resulting in poor reliability.

When characters and figures created by a personal computer are printed out as monochrome images using a 400-dpi printer, for example, if an image described in a page description language is rasterized, staircasing inevitably remains. In case of a color printout, since image data that places an importance on gradation may be simultaneously transferred, if the resolution of such image data is also increased by smoothing in the same manner as in other areas, the image quality deteriorates.

SUMMARY OF THE INVENTION

It is an object of the present invention to provide an image processing apparatus and method, which can eliminate staircasing in color characters and line images even in a gradation image by smoothing a multi-color, multi-valued image, and can improve the image quality.

In order to achieve the above object, an image processing apparatus according to the present invention comprises the following arrangement.

That is, an image processing apparatus comprises:

input means for inputting multi-valued image data having a plurality of color components;

detection means for detecting an area to be smoothed from the multi-valued image data having the plurality of color components; and smoothing means for smoothing multi-valued image data included in the area detected by the detection means in units of color components.

In order to achieve the above object, an image processing method according to the present invention has the following features.

That is, an image processing method comprises:

the input step of inputting multi-valued image data having a plurality of color components;

the detection step of detecting an area to be smoothed from the multi-valued image data having the plurality of color components; and the smoothing step of smoothing multi-valued image data included in the area detected in the detection step in units of color components.

It is another object of the present invention to provide an image processing apparatus and method, which can further improve image quality by executing adaptive processing of a full-color image input from an external equipment using image separation information and attribute map information.

In order to solve the above-mentioned problems and to achieve the object, an image processing apparatus according to the present invention comprises the following arrangement.

That is, an image processing apparatus comprises:

input means for inputting a command that represents an image;

bitmap data generation means for generating bitmap data on the basis of the command that represents the image; and attribute generation means for generating attribute information on the basis of an attribute of an object that forms an image, and the bitmap data.

An image processing method according to the present invention has the following features.

That is, an image processing method comprises:

the input step of inputting a command that represents an image;

the bitmap data generation step of generating bitmap data on the basis of the command that represents the image; and the attribute generation step of generating attribute information on the basis of an attribute of an object that forms an image, and the bitmap data.

It is still another object of the present invention to provide an image processing apparatus and method, which can reproduce smooth characters and figures by increasing their resolution by smoothing their edges, and can output image data, which places an importance on gradation, without increasing its resolution, even when such image data is transferred.

In order to solve the above-mentioned problems and to achieve the above object, an image processing apparatus according to the present invention comprises the following arrangement.

That is, an image processing apparatus comprises:

input means for inputting image data having a plurality of color components, obtained by color-separating an image;

detection means for detecting an area to be smoothed from the image data having the plurality of color components;

smoothing means for smoothing the image data having the plurality of color components included in the area detected by the detection means;

output means for outputting a recording signal of a predetermined resolution on the basis of the smoothed image data; and switching means for switching an output resolution of the output means.

An image processing method according to the present invention has the following features.

That is, an image processing method comprises:

the input step of inputting image data having a plurality of color components, obtained by color-separating an image;

the detection step of detecting an area to be smoothed from the image data having the plurality of color components;

the smoothing step of smoothing the image data having the plurality of color components included in the area detected in the detection step;

the output step of outputting a recording signal of a predetermined resolution on the basis of the smoothed image data; and the switching step of switching an output resolution of the output step in correspondence with a characteristic of the smoothed image data.

Other objects and advantages besides those discussed above shall be apparent to those skilled in the art from the description of preferred embodiments of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 11 is a block diagram showing the detailed arrangement of a character/halftone detector 903 shown in FIG. 10;

FIG. 12 is a block diagram showing the detailed arrangement of a dot pattern area detector 904 shown in FIG. 10;

FIGS. 13A to 13D show the edge direction detection rules in an edge direction detector 2044 shown in FIG. 12;

FIG. 14 shows values of pixels around the pixel of interest, i.e., values output from the edge direction detector 2044;

FIG. 18 shows the encode rule of an encoder 2083;

FIG. 26 is a view for explaining an example of interpolation in a smoothing processing circuit 1003 shown in FIG. 21;

FIGS. 29A to 29E are enlarged views of portion A in FIG. 28;

FIGS. 35A and 35B are views for explaining the algorithm for extracting the feature of a dot pattern over the entire matrix area and discriminating whether or not the dot pattern is to be smoothed; and FIGS. 36 to 38 show examples of memory maps when the image processing method of the present invention is stored in a storage medium.

DETAILED DESCRIPTION OF THE PREFERRED EMBODIMENTS

The preferred embodiments of the present invention will be described in detail hereinafter with reference to the accompanying drawings.

[First Embodiment]

Figure 1:
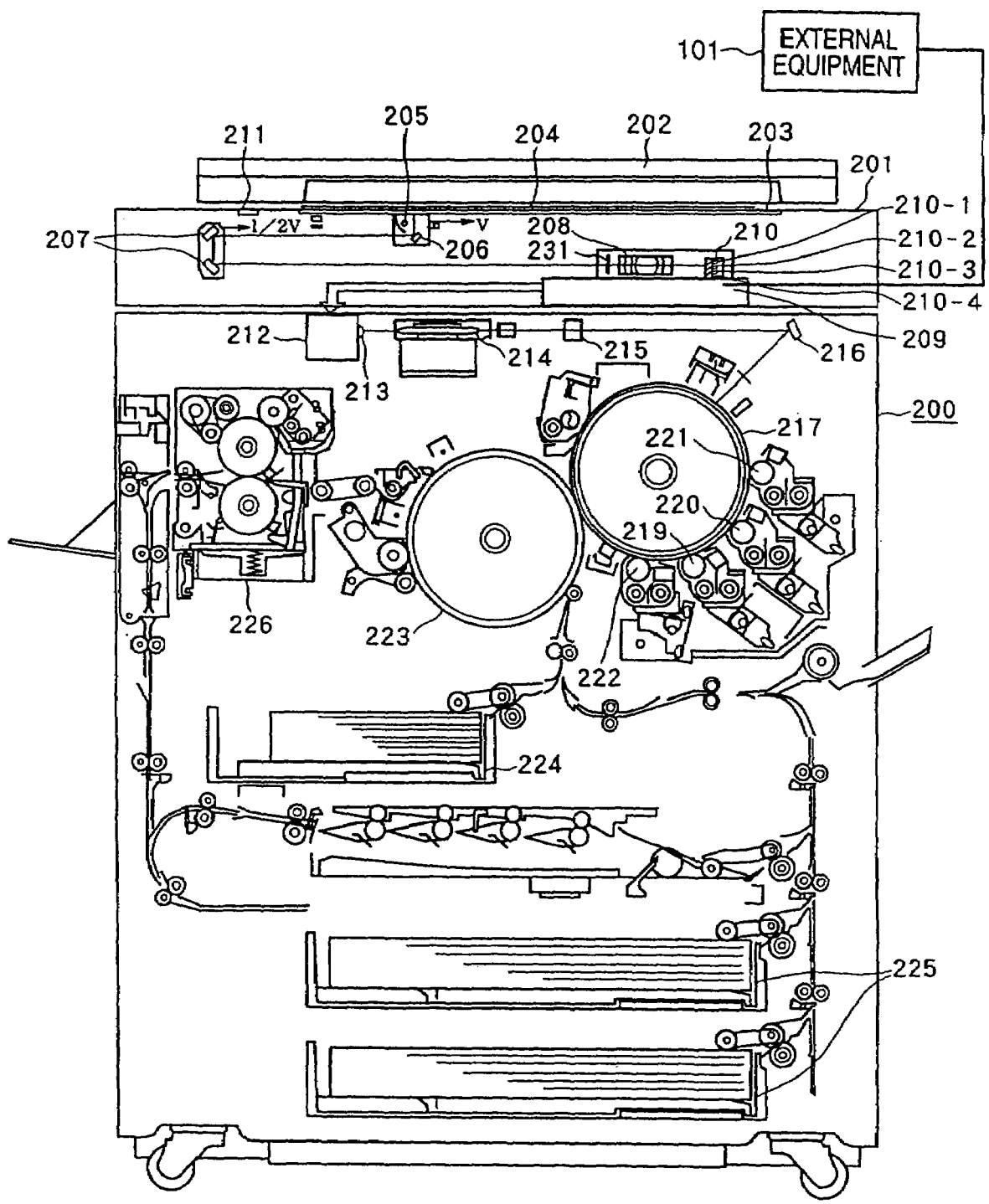
FIG. 1 is a view showing the outer appearance of an apparatus according to the first embodiment of the present invention.

FIG. 1 is a view showing the outer appearance of an apparatus according to the first embodiment of the present invention.

In FIG. 1, an image scanner module 201 reads an original image, and performs digital signal processing of the read image. A printer module 200 prints out a full-color image corresponding to the original image read by the image scanner module 201 onto a paper sheet.

In the image scanner module 201, light emitted by a halogen lamp 205 and to be irradiated onto an original 204 on an original table glass (to be referred to as a platen hereinafter) 203 is irradiated onto an original pressing plate 202. Light reflected by the original is guided by mirrors 206 and 207, and is imaged on a 3-line sensor (to be referred to as a CCD hereinafter) 210 via a lens 208. The lens 208 has an infrared cut filter 231.

The CCD 210 color-separates optical information obtained from the original, reads the red (R), green (G), and blue (B) components of full-color information, and sends them to a signal processing unit 209.

Each of color component read sensor arrays of the CCD 210 is comprised of 5,000 pixels. With these pixels, the CCD 210 reads the widthwise direction (297 mm) of an A3-size original as a maximum one of those placed on the platen 203 at a resolution of 400 dpi.

Note that a first sub-scanning unit (205 and 206) scans the entire original surface when it mechanically moves in a direction (to be referred to as a sub-scanning direction hereinafter) perpendicular to an electrical scanning direction (to be referred to as a main scanning direction hereinafter) of the CCD at a velocity v, and a second scanning unit (207) scans the entire original surface when it mechanically moves in the direction perpendicular to the electrical scanning direction of the CCD at a velocity 0.5 v.

A standard white plate 211 is used for generating correction data for data read by R, G, and B sensors 210-1 to 210-3.

The standard white plate 211 exhibits nearly uniform reflection characteristics for visible light, and is white in visible range. Using this standard white plate 211, output data from the sensors 210-1 to 210-3 in visible range are corrected.

The image signal processing unit 209 processes the read optical information as electrical signals to separate it into magenta (M), cyan (C), yellow (Y), and black (BK) components, and sends them to the printer module 200. Since one of M, C, Y, and BK components is sent to the printer module 200 per original scan of the image scanner module 201, a single printout is completed by a total of four original scans (for four colors).

An image signal, i.e., one of M, C, Y, and BK color components sent from the image scanner module 201 is supplied to a laser driver 212. The laser driver 212 modulates and drives a semiconductor laser 213 in correspondence with the image signal. A laser beam scans the surface of a photosensitive drum 217 via a polygonal mirror 214, f-θ lens 215, and mirror 216.

Reference numerals 219 to 222 denote magenta, cyan, yellow, and black developers. These four developers alternately contact the photosensitive drum to develop an electrostatic latent image of one of the M, C, Y, and BK color components formed on the photosensitive drum 217 with corresponding toner.

A paper sheet fed from a paper cassette 224 or 225 is wound around a transfer drum 223, which transfers the toner image developed on the photosensitive drum 217 onto the paper sheet.

With the above-mentioned procedure, a total of four color images are frame-sequentially transferred onto the paper sheet in units of M, C, Y, and BK color components, and the paper sheet is then exhausted via a fixing unit 226.

A summary of the operation of the apparatus has been given.

The image scanner module 201 will be described in detail below.

Figure 2A:
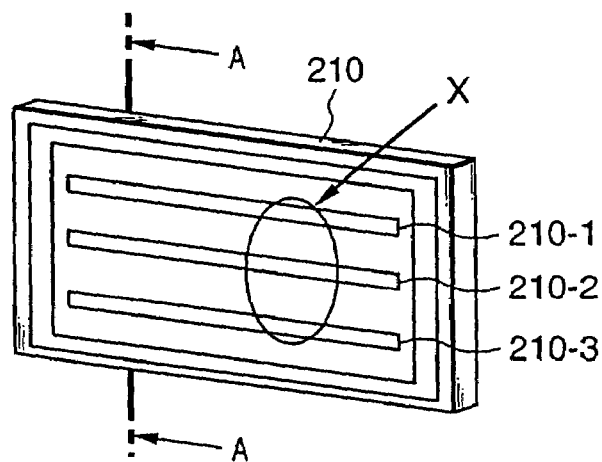
FIG. 2A is a perspective view showing a CCD 210 used in the apparatus shown in FIG. 1.

FIG. 2A shows the outer appearance of the CCD 210 used in the apparatus shown in FIG. 1.

In FIG. 2A, reference numeral 210-1 denotes a light-receiving element array for reading red light (R); 210-2, a light-receiving element array for reading green light (G); and 210-3, a light-receiving element array for reading blue light (B).

Figure 2B:
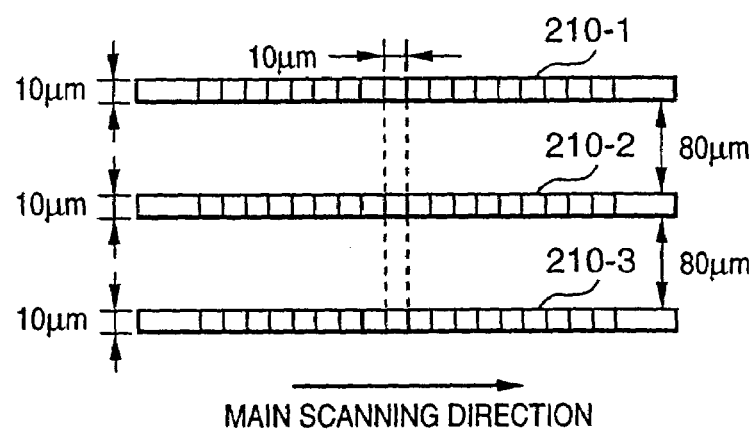
FIG. 2B is an enlarged view of a portion X shown in FIG. 2A.

The R, G, and B light-receiving element arrays 210-1 to 210-3 have 10 μm×10 μm openings in the main scanning and sub-scanning directions, as shown in FIG. 2B.

These three light-receiving element arrays having different optical characteristics are monolithically formed on a single silicon chip so that the R, G, and B sensor arrays are disposed parallel to each other to read an identical line on an original.

Using the CCD with this arrangement, a common optical system such as a lens and the like can be used upon reading separated colors.

In this way, optical adjustment in units of R, G, and B color components can be simplified.

Figure 2C:
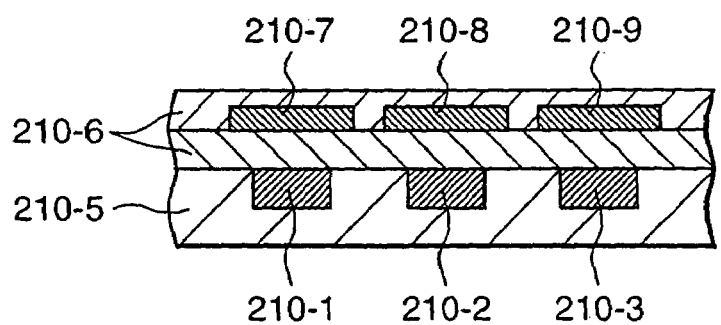
FIG. 2C is a sectional view taken along a line A—A in FIG. 2A.

FIG. 2B is an enlarged view of a portion X shown in FIG. 2A, and FIG. 2C is a sectional view taken along a line A—A in FIG. 2A.

In FIG. 2C, the photosensor 210-1 for reading red light, and the photosensors 210-2 and 210-3 for reading visible information of green and read are formed on a silicon substrate 210-5.

An R filter 210-7 for transmitting the red (R) wavelength component of visible light is set on the red photosensor 210-1. Similarly, G and B filters 210-8 and 210-9 for respectively transmitting the green (G) and blue (B) wavelength components are set on the green and blue photosensors 210-2 and 210-3. Reference numeral 210-6 denotes a planarization layer formed of a transparent organic film.

In FIG. 2B, each of the photosensors 210-1 to 210-3 has a length of 10 μm per pixel in the main scanning direction. Each of the photosensors 210-1 to 210-3 has 5,000 pixels in the main scanning direction to be able to read the widthwise direction (297 mm) of an A3-size original at a resolution of 400 dpi.

The line spacing between adjacent R, G, and B photosensors 210-1 to 210-3 is 80 μm, i.e., the adjacent photosensors are spaced by 8 lines which correspond to 400 dpi sub-scanning resolution.

The density reproduction method of the printer will be explained below.

This embodiment uses so-called pulse width modulation (PWM) for density reproduction of the printer, and controls the ON time of the laser 213 in correspondence with an image density signal. With this control, an electrostatic latent image with a potential corresponding to the ON time of the laser is formed on the photosensitive drum 217. Density reproduction is attained by developing the electrostatic latent image with toner corresponding in amount to the potential of the latent image using the developers 219 to 222.

Figure 3:
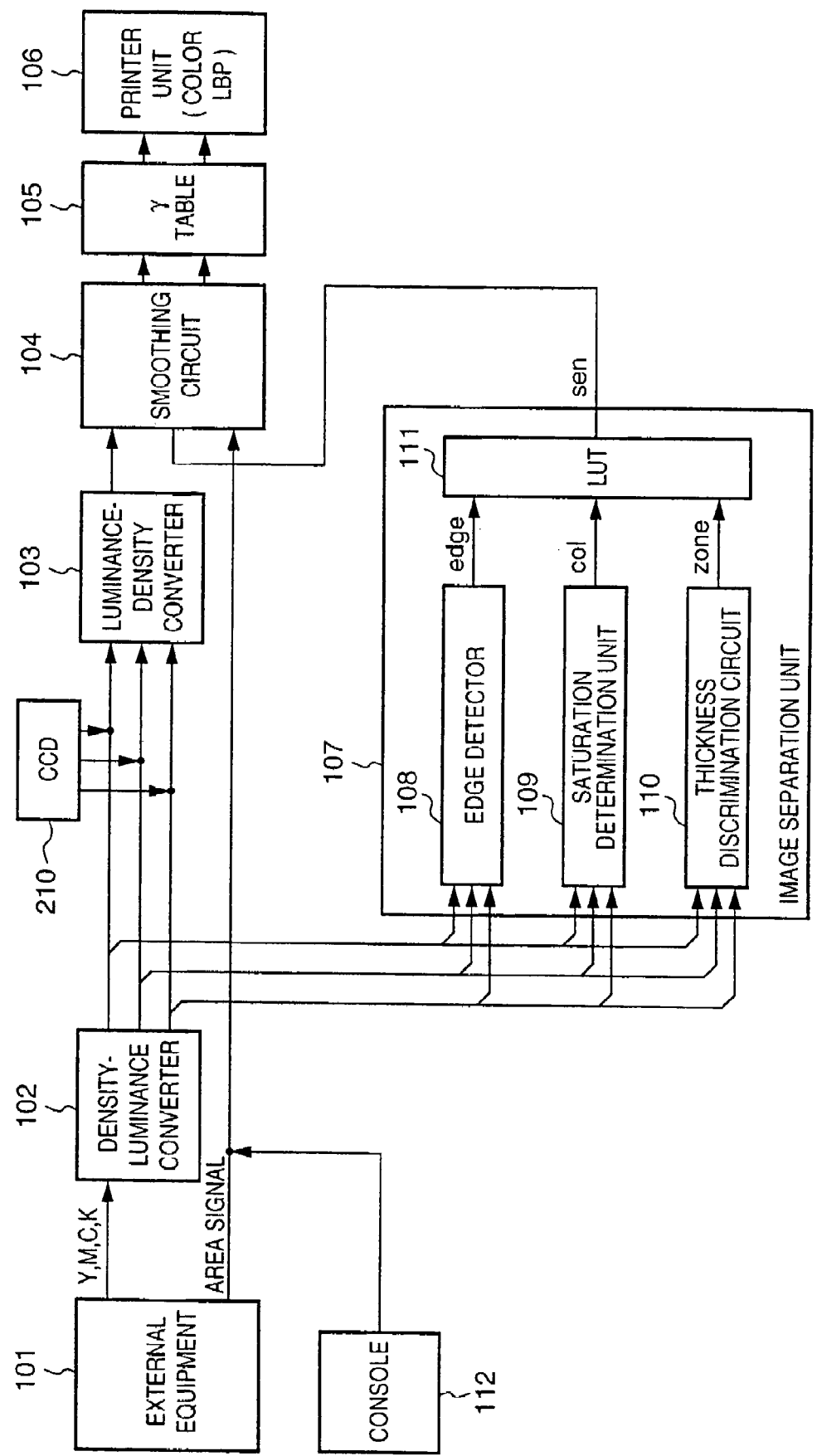
FIG. 3 is a block diagram showing the detailed arrangement of an image signal processing unit 209 shown in FIG. 1.
Figure 4:
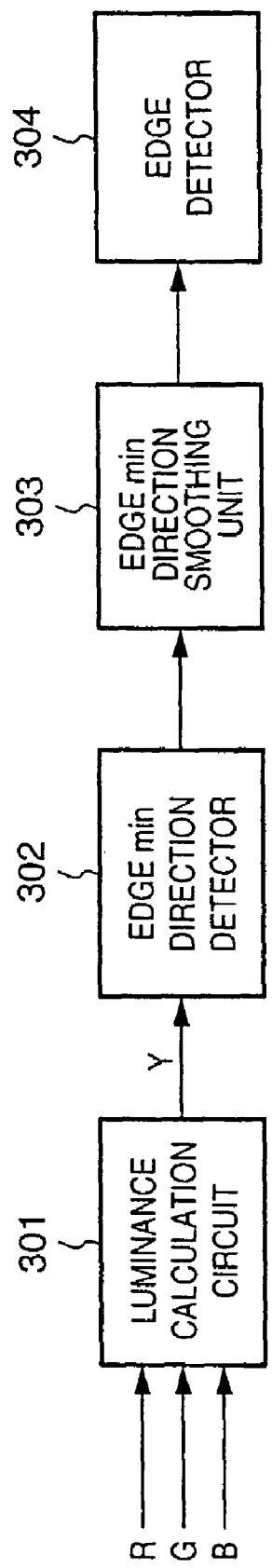
FIG. 4 is a block diagram showing the detailed arrangement of a density-luminance conversion unit 102 shown in FIG. 3.

FIG. 3 is a block diagram showing the detailed arrangement of the image signal processing unit 209.

In FIG. 3, image signals Y, M, C, and K output from an external equipment 101 such as a computer or the like are sequentially transferred in units of scanning frames in a printer unit 106, and a density-luminance converter 102 converts density signals Y, M, C, and K into luminance signals R, G, and B using a look-up table ROM in units of colors.

A luminance-density converter 103 converts three primary color signals R, G, and B transferred from the CCD 210 or the external equipment into density signals Y, M, C, and K, and frame-sequentially outputs the density signals to have a predetermined bit width (8 bits).

A smoothing circuit 104 generates data having a resolution twice the reading resolution in accordance with a result from an image area separation unit 107 and an area signal supplied from a console 112 or the external equipment 101, as will be described later. A γ table 105 converts the resolution-converted density data in correspondence with the gradation reproduction characteristics of the printer. The processed image signals M, C, Y, and K and an sen signal as a switching signal between 400 dpi/800 dpi are sent to the laser driver, and the printer unit 106 performs density recording by PWM.

The image area separation unit 107 has an edge detector 108, saturation determination unit 109, thickness discrimination circuit 110, and look-up table (LUT) 111. The edge detector 108 generates an edge signal edge from image signals R, G, and B output from the density-luminance converter 102, and outputs it to the LUT 111. The saturation determination unit 109 generates a saturation signal col from image signals R, G, and B output from the density-luminance converter 102, and outputs it to the LUT 111. The thickness discrimination circuit 110 generates a thickness signal zone from image signals R, G, and B output from the density-luminance converter 102, and outputs it to the LUT 111.

A black character/black line image detection method will be explained below.

<Operation of Edge Detector 108 in FIG. 3>

The density-luminance converted signals R, G, and B are input to the edge detector 108, and a luminance calculation circuit 301 shown in FIG. 1 calculates a luminance signal Y given by:

$$Y=0.25R+0.5G+0.25B \quad (1)$$

Figure 5:
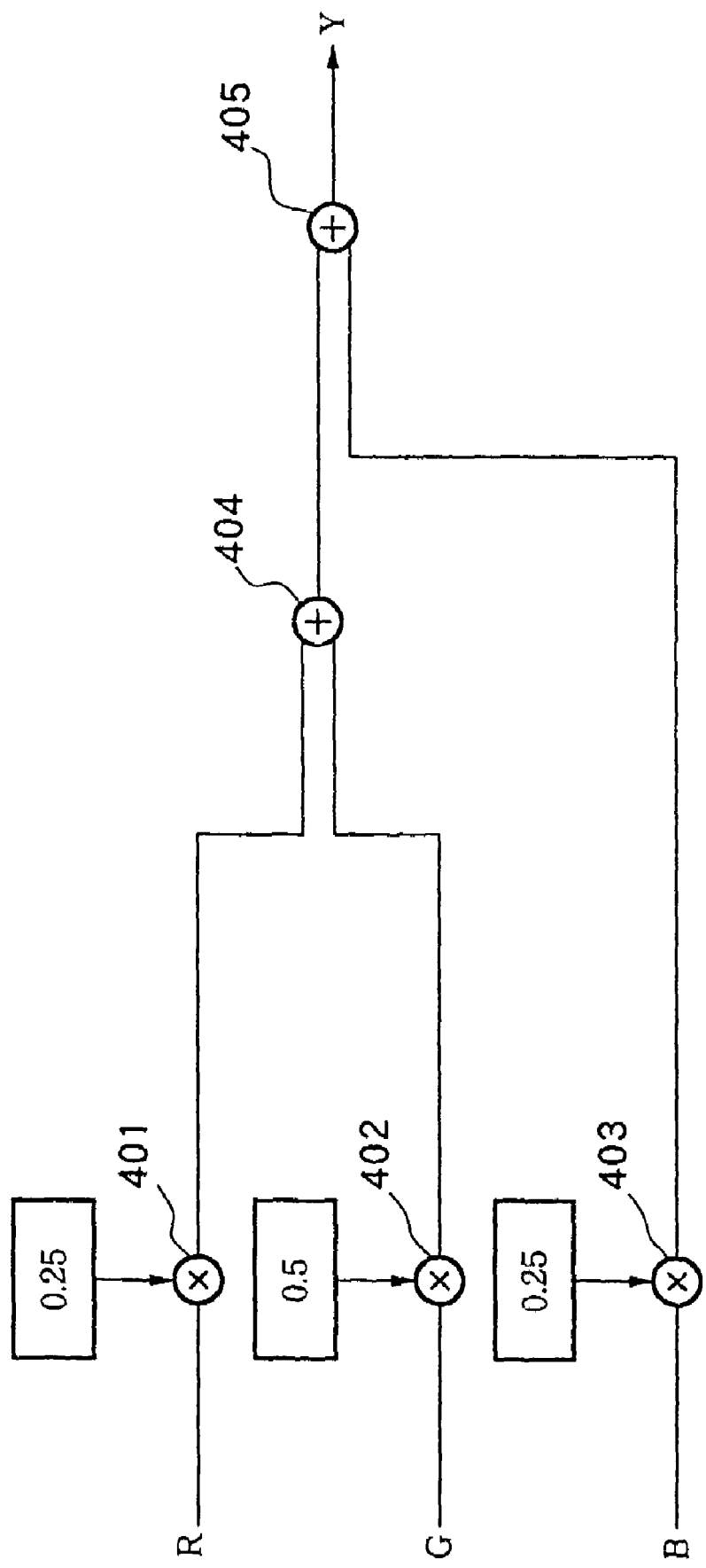
FIG. 5 is a block diagram showing the detailed arrangement of a luminance calculation circuit 301 shown in FIG. 4.

FIG. 5 shows the detailed arrangement of the luminance calculation circuit 301. In FIG. 5, multipliers 401, 402, and 403 respectively multiply input color component signals R, G, and B by coefficients "0.25", "0.5", and "0.25", and adders 404 and 405 add the products to obtain the luminance signal Y given by equation (1).

Figure 6:
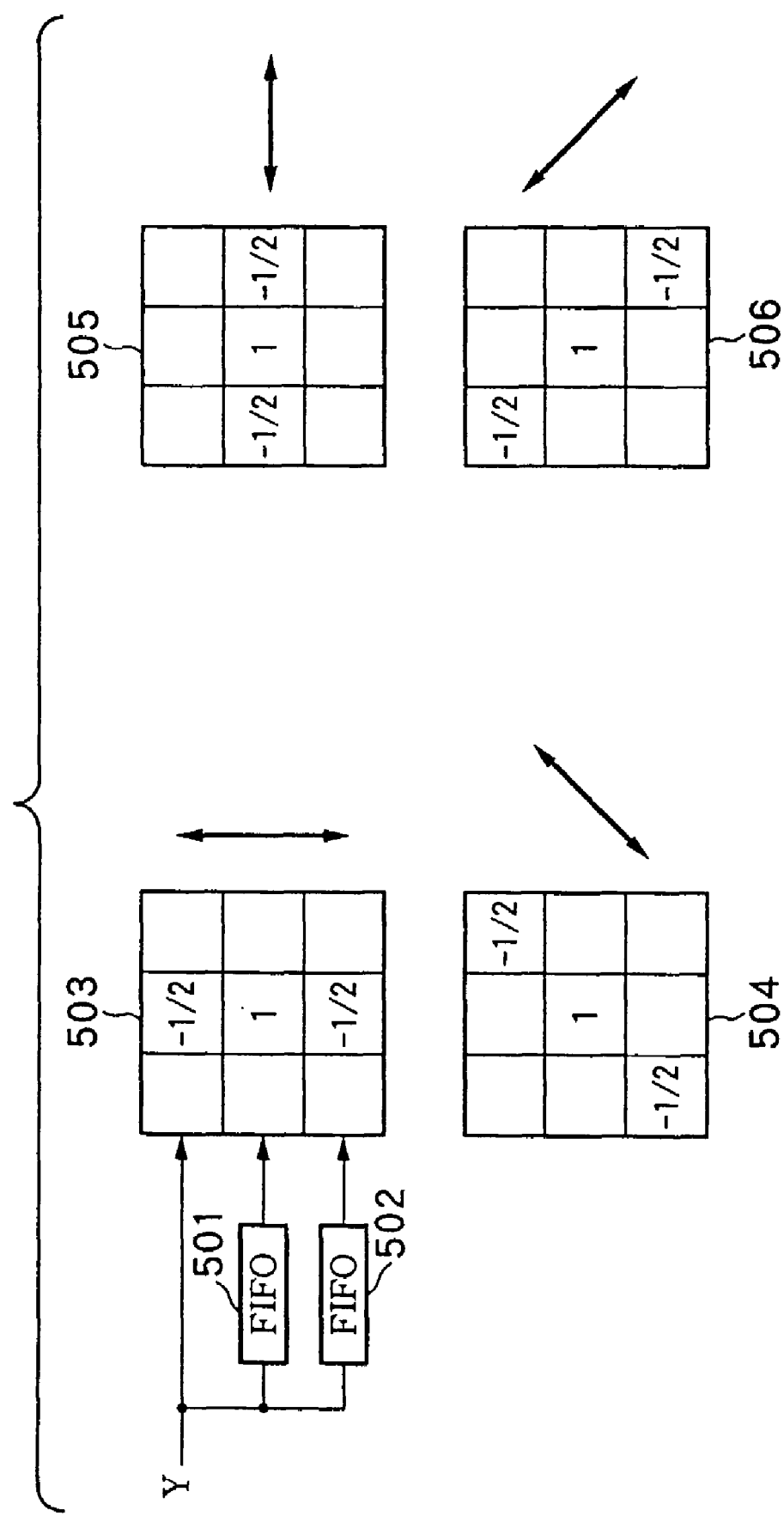
FIG. 6 is a view for explaining the processing in an edge min direction detector 302 shown in FIG. 4.

The luminance signal Y input to an edge min direction detector 302 is expanded to three lines delayed by one line by FIFOs 501 and 502 shown in FIG. 6, and these signals are filtered by so-called Laplacian filters 503 to 506 to obtain a direction in which an absolute value a of the edge amount as the output from each filter assumes a minimum value. The obtained direction is determined as an edge min direction.

An edge min direction smoothing unit 303 smoothes data in the edge min direction obtained by the edge min direction detector 302. With this smoothing, edge components in only the direction corresponding to the largest edge component can be preserved, and those in other directions can be smoothed. More specifically, the feature of a dot pattern component which has large edge components in a plurality of directions decreases since the edge components are smoothed. On the other hand, the feature of a character/thin line component which has an edge component in only one direction can be preserved. By repeating this processing as needed, line and dot pattern components can be separated more effectively, and any character component present in a dot pattern, which cannot be detected by edge detection methods used to date, can be detected.

After that, in an edge detector 304, the output from the smoothing unit 303 is filtered by the above-mentioned Laplacian filters to remove data equal to or smaller than the absolute value a of the edge amount, and to output only data larger than a as "1".

Figure 7B:
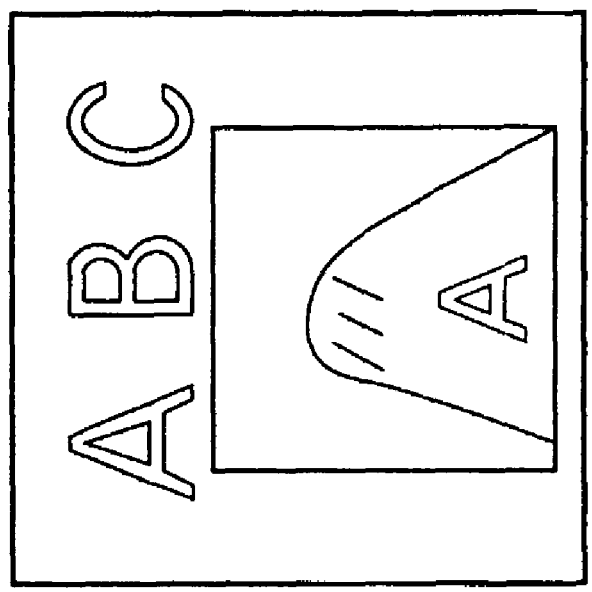
FIGS. 7A and 7B are views showing image data and an edge detection signal in luminance data Y.
Figure 7A:
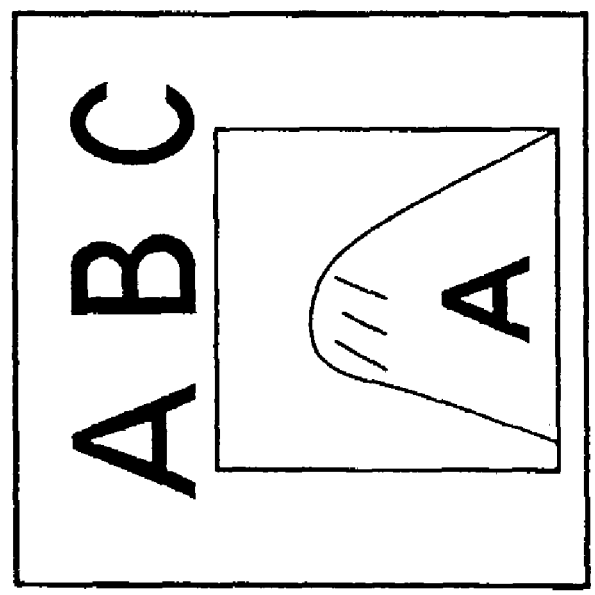

FIGS. 7A and 7B show image data and an edge detection signal in luminance data Y.

Furthermore, the output signal "edge" (3 bits) from the edge detector 108 shown in FIG. 3 expresses the discrimination signal by five codes, i.e., signals expanded by 7×7, 5×5, and 3×3 block sizes, the absence of expansion, and the absence of edge. Note that signal expansion means ORing the signal values of all the pixels in a block.

<Operation of Saturation Determination Unit 109 in FIG. 3>

Figure 8:
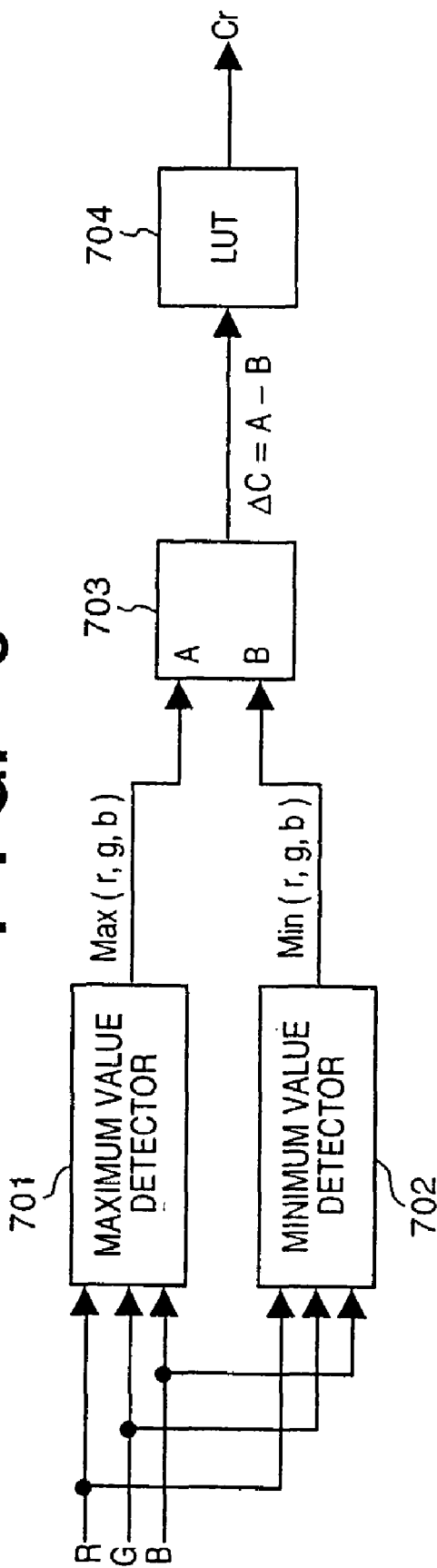
FIG. 8 is a block diagram showing the detailed arrangement of a saturation determination unit 109 shown in FIG. 3.

FIG. 8 shows the detailed arrangement of the saturation determination unit 109.

Figure 9:
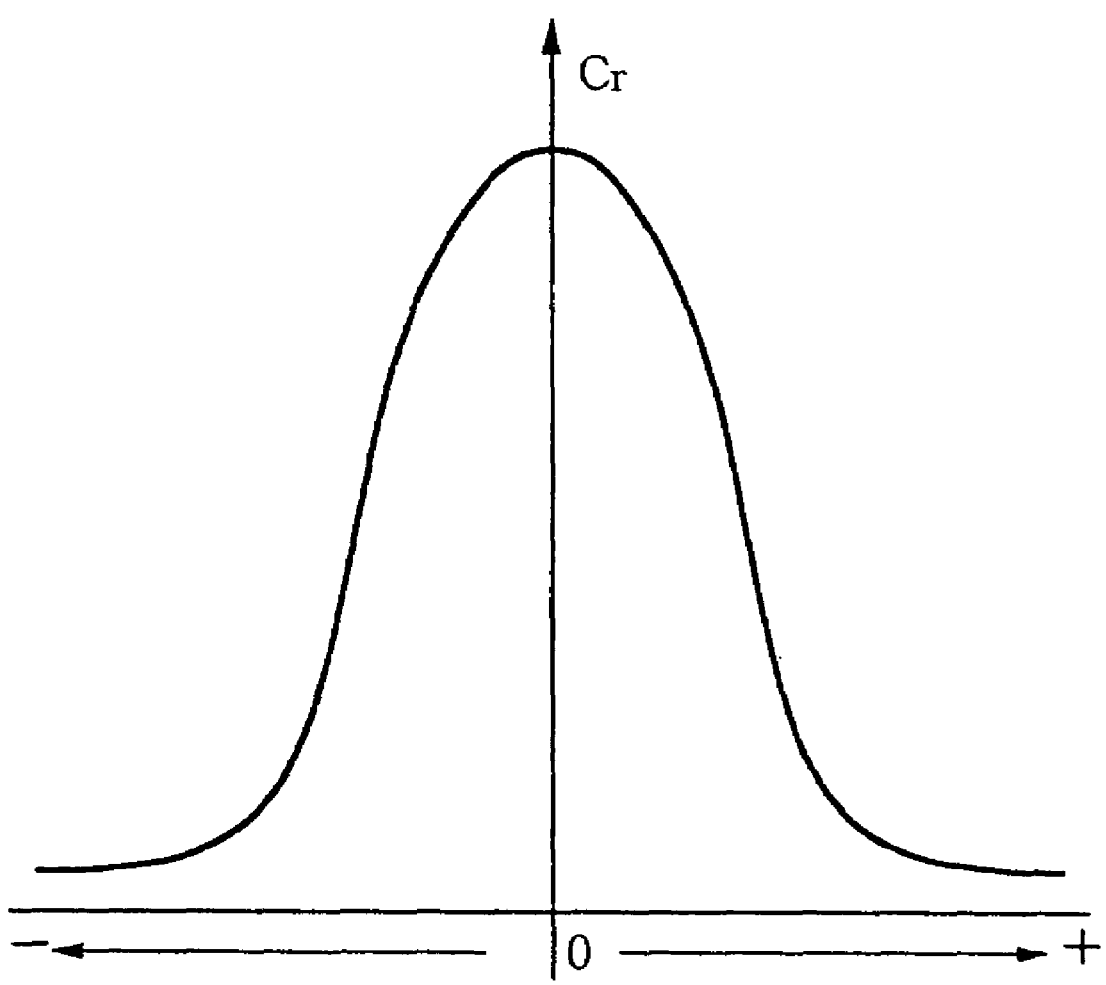
FIG. 9 is a graph showing the characteristics of a saturation signal Cr in the saturation determination unit 109 shown in FIG. 3.

As shown in FIG. 8, maximum and minimum value detectors 701 and 702 respectively extract maximum and minimum values MAX(r, g, b) and MIN(r, g, b) from color component signals R, G, and B, and a subtracter 703 calculates a difference ΔC between these maximum and minimum values. An LUT (look-up table) 704 converts the difference ΔC in accordance with the characteristics shown in FIG. 9, thus generating a saturation signal Cr. In FIG. 9, as ΔC is closer to "0", saturation is lower (closer to achromatic color); as ΔC is larger, the color is closer to chromatic color. Hence, from the characteristics shown in FIG. 9, Cr assumes a larger value as the color is closer to achromatic color, and approaches "0" as the color is closer to chromatic color. The signal Cr changes at the rate shown in FIG. 9. Note that the output signal col shown in FIG. 3 expresses color, black, intermediate (color between the color and black), and white using 2-bit codes.

<Operation of Thickness Discrimination Circuit 110 in FIG. 3>

Figure 10:
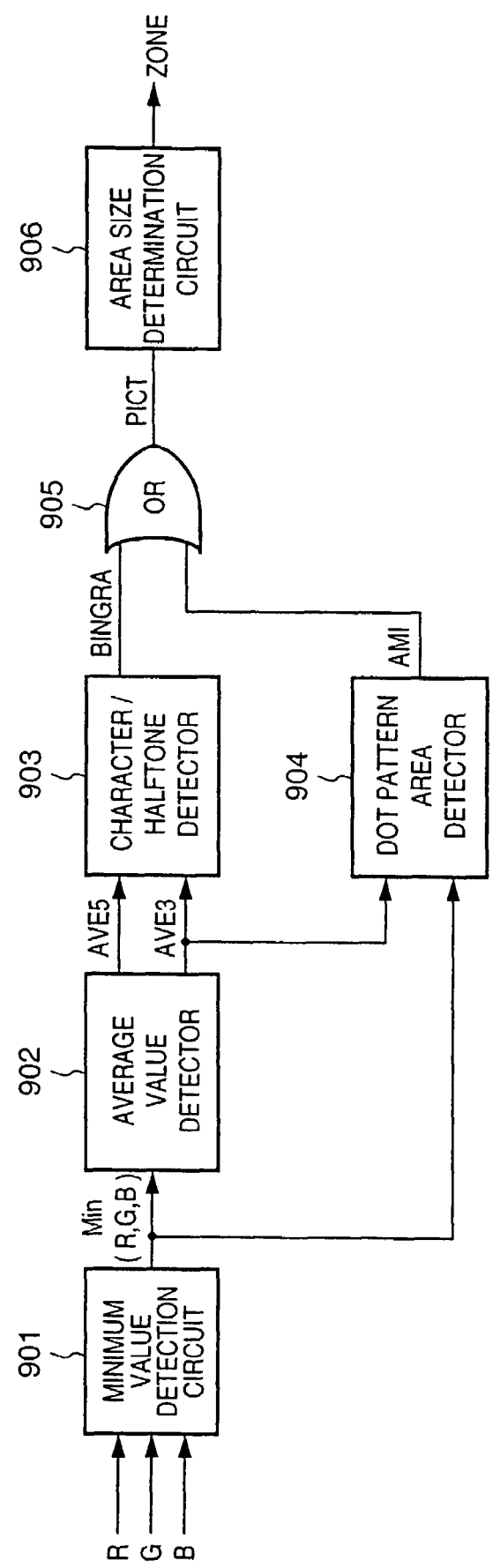
FIG. 10 is a block diagram showing the detailed arrangement of a character thickness discrimination circuit 110.
Figure 15A:
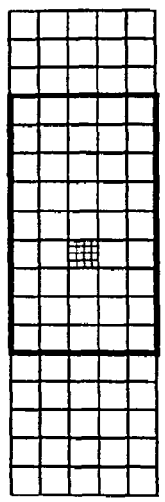
FIGS. 15A to 15I show patterns of a window set by a counter 2049 shown in FIG. 12.
Figure 15B:
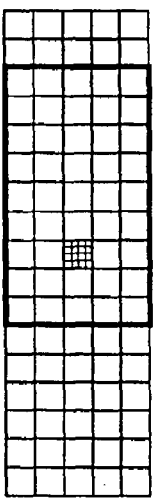
Figure 15C:
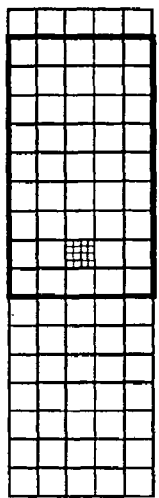
Figure 15D:
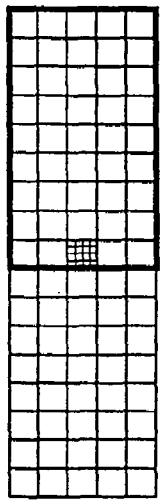
Figure 15E:
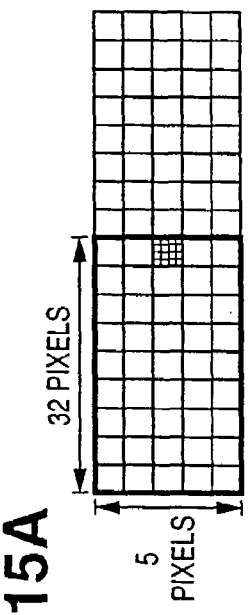
Figure 15F:
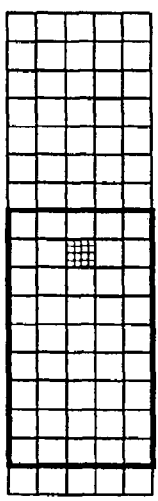
Figure 15G:
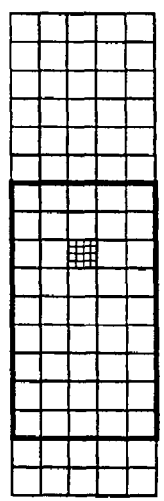
Figure 15H:
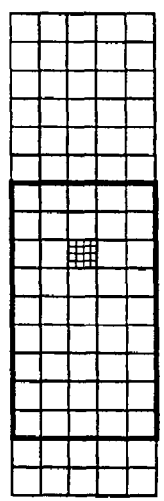
Figure 15I:
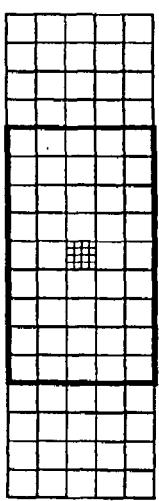

FIG. 10 shows the detailed arrangement of the character thickness discrimination circuit 110.

In FIG. 10, color component signals R, G, and B are input to a minimum value detection circuit 901. The minimum value detection circuit 901 detects a minimum value MINR, MING, or MINB of the input R, G, and B signals. The value MINR, MING, or MINB is input to an average value detector 902 to calculate an average value AVE5 of MINR, MING, or MINB in 5 pixels×5 pixels around the pixel of interest, and an average value AVE3 of MINR, MING, or MINB in 3 pixels×3 pixels around the pixel of interest.

The values AVE5 and AVE3 are input to a character/halftone detector 903. The character/halftone detector 903 detects the change amount between the density of the pixel of interest and the average density of the pixel of interest and its surrounding pixels in units of pixels, thus discriminating if the pixel of interest is a portion of a character or halftone area.

FIG. 11 shows the detailed arrangement of the character/halftone detector 903 shown in FIG. 10. In FIG. 11, in the character/halftone detector 903, a proper offset value OFST1 is added to AVE5, and the sum is compared with AVE3 in a comparator 2031. Also, the sum is compared with a proper limit value LIM1 in a comparator 2032. The output values from the two comparators are input to an OR gate 2033, an output signal BINGRA of which goes High when:

$$\text{AVE5+OFST1>AVE3} \quad (2)$$

or $$\text{AVE5+OFST1>LIM1} \quad (3)$$

That is, when this circuit detects that a change in density is present near the pixel of interest (character edge portion) or pixels near the pixel of interest have a density equal to or larger than a given value (inside a character and a halftone portion), the character/halftone signal BINGRA goes High.

Subsequently, a dot pattern area detector 904 detects a dot pattern area. FIG. 12 shows the detailed arrangement of the dot pattern area detector 904 in FIG. 10. In FIG. 12, a proper offset value OFST2 is added to the value MINR, MING, or MINB detected by the minimum value detection circuit 901, and the sum is compared with AVE5 in a comparator 2041. Also, a comparator 2042 compares MINR, MING, or MINB with a proper limit value LIM2. The output values from the two comparators are input to an OR gate 2043, an output signal BINAMI of which goes High when:

$$\text{MIN}(R, G, B)\text{+OFST2>AVE5} \quad (4)$$

or $$\text{MIN}(R, G, B)\text{+OFST2>LIM2} \quad (5)$$

Using the signal BINAMI, an edge direction detector 2044 detects the edge direction in units of pixels. FIGS. 13A to 13D show the edge direction detection rules in the edge direction detector 2044. In FIGS. 13A to 13D, when eight pixels around the pixel of interest satisfy one of conditions shown in FIGS. 13A to 13D, one of bits 0 to 3 of an edge direction signal DIRAMI is set High.

Furthermore, an opposing edge detector 2045 detects opposing edges in an area of 5 pixels×5 pixels that surround the pixel of interest. In a coordinate system which includes the signal DIRAMI of the pixel of interest as pixel A33 shown in FIG. 14, the opposing edge detection rules are as follows:

(1) bit 0 of one of pixels A11, A21, A31, A41, A51, A22, A32, A42, and A33 is High, and bit 1 of one of pixels A33, A24, A34, A44, A15, A25, A35, A45, and A55 is High;

(2) bit 1 of one of pixels A11, A21, A31, A41, A51, A22, A32, A42, and A33 is High, and bit 0 of one of pixels A33, A24, A34, A44, A15, A25, A35, A45, and A55 is High;

(3) bit 2 of one of pixels A11, A12, A13, A14, A15, A22, A23, A24, and A33 is High, and bit 3 of one of pixels A33, A42, A43, A44, A51, A52, A53, A54, and A55 is High; and (4) bit 3 of one of pixels A11, A12, A13, A14, A15, A22, A23, A24, and A33 is High, and bit 2 of one of pixels A33, A42, A43, A44, A51, A52, A53, A54, and A55 is High.

When one of conditions (1) to (4) above is satisfied, a signal EAAMI goes High.

When opposing edges are detected by the opposing edge detector 2045, the opposing edge signal EAAMI goes High.

Then, an expansion circuit 2046 shown in FIG. 12 performs expansion of 3 pixels×4 pixels for the signal EAAMI, and if a pixel with High EAAMI is included in 3 pixels×4 pixels around the pixel of interest, the signal EAAMI of the pixel of interest is rewritten to High. Furthermore, using a contraction circuit 2047 and expansion circuit 2048, an isolated detection result in an area of 5 pixels×5 pixels is removed to obtain an output signal EBAMI. Note that the contraction circuit 2047 outputs High only when all the input signals are High.

A counter 2049 counts the number of pixels corresponding to High output signals EBAMI from the expansion circuit 2048 within a window having an appropriate size. In this embodiment, an area of 5 pixels×64 pixels including the pixel of interest is referred to. FIGS. 15A to 15I show window patterns. In FIGS. 15A to 15I, sample points in a window are nine points at 4-pixel intervals in the main scanning direction, and five lines in the sub-scanning direction, i.e., a total of 45 points. By moving this window in the main scanning direction for one pixel of interest, nine windows shown in FIGS. 15A to 15I are prepared. That is, the area of 5 pixels×64 pixels having the pixel of interest as the center is referred to. In the individual windows, the number of High signals EBAMI is counted, and when the number of High signals EBAMI exceeds an appropriate threshold value, a dot pattern area signal AMI goes High.

As described above, with the processing in the dot pattern area detector 904 shown in FIG. 10, a dot pattern image detected as a set of isolated points by the above-mentioned signal BINGRA can be detected as an area signal.

The character/halftone area signal BINGRA and dot pattern area signal AMI detected by the above-mentioned processing are ORed by an OR gate 905, thus generating a binary signal PICT of the input image.

Then, the signal PICT is input to an area size determination circuit 906 to discriminate the area size of the binary signal.

Figure 16:
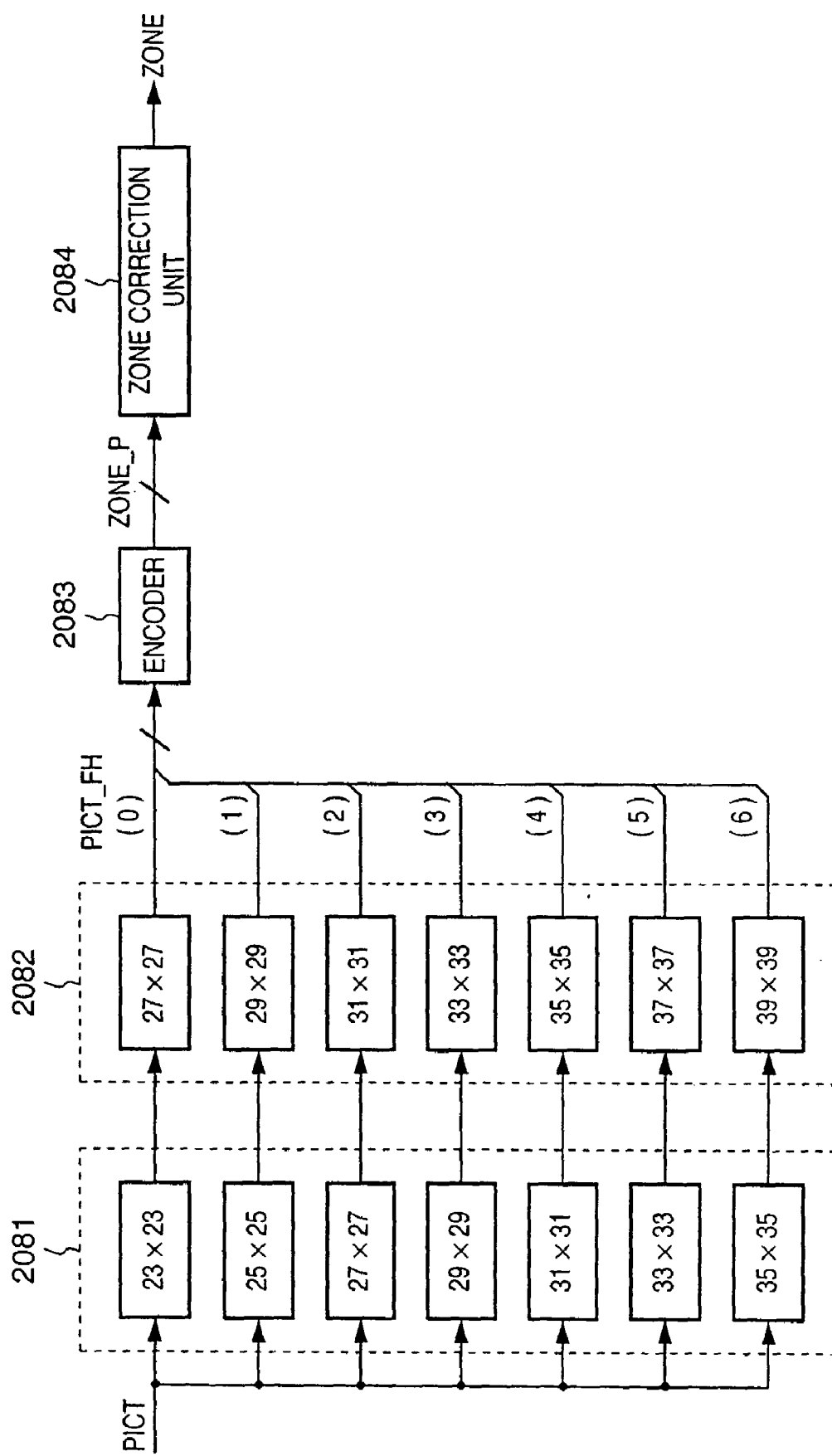
FIG. 16 is a block diagram showing the detailed arrangement of an area size determination circuit 906 shown in FIG. 10.

FIG. 16 shows the detailed arrangement of the area size determination circuit 906 shown in FIG. 10. As shown in FIG. 16, the area size determination circuit 906 includes a plurality of pairs of contraction circuits 2081 and expansion circuits 2082, which have different area sizes to refer to. The signal PICT is line-delayed in correspondence with the sizes of the contraction circuits, and is then input to the contraction circuits 2081. In this embodiment, seven different contraction circuits from 23 pixels×23 pixels to 35 pixels× 35 pixels are prepared. Signals output from the contraction circuits 2081 are line-delayed, and are then input to the expansion circuits 2082. In this embodiment, seven different expansion circuits from 27 pixels×27 pixels to 39 pixels×to 39 pixels are prepared in correspondence with the outputs from the contraction circuits shown in FIG. 16, and output signals PICT_FH from the respective expansion circuits are obtained.

When the pixel of interest is a portion of a character, the output signal PICT_FH is determined by the thickness of that character.

Figure 17:
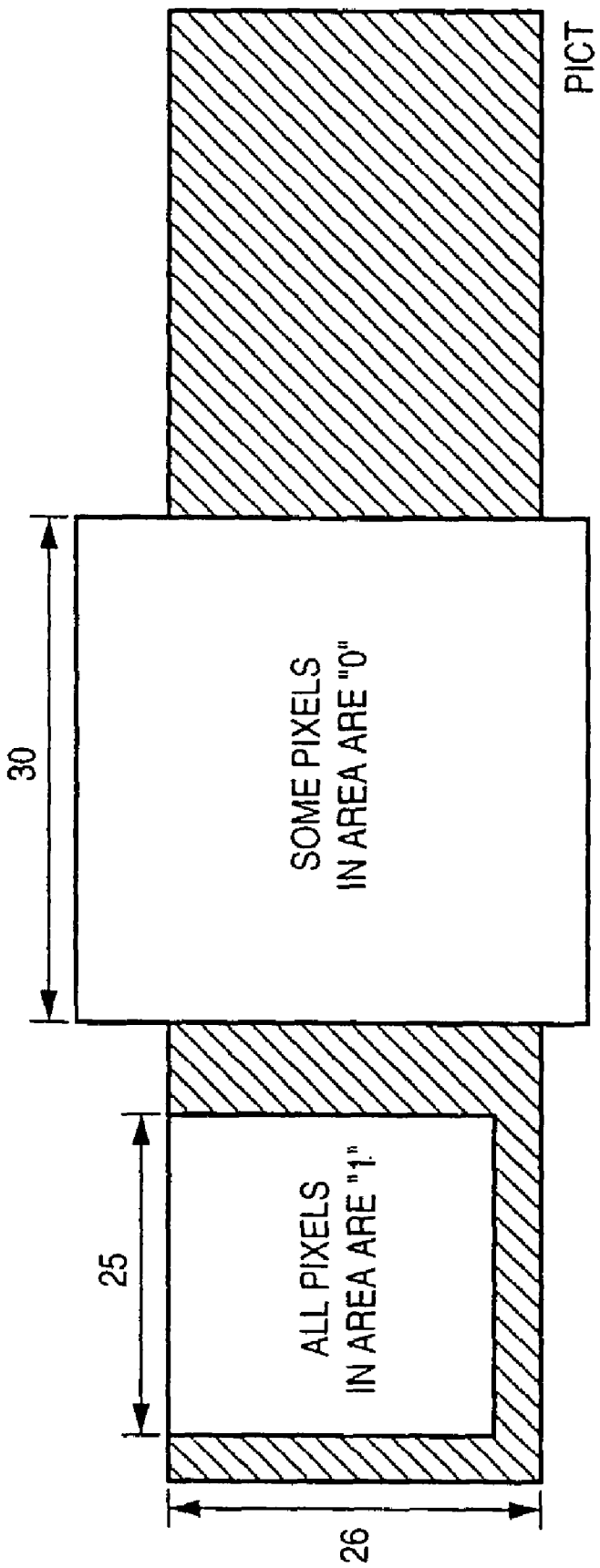
FIG. 17 is an explanatory view of the procedure for determining an output signal PICT_FH.
Figure 19:
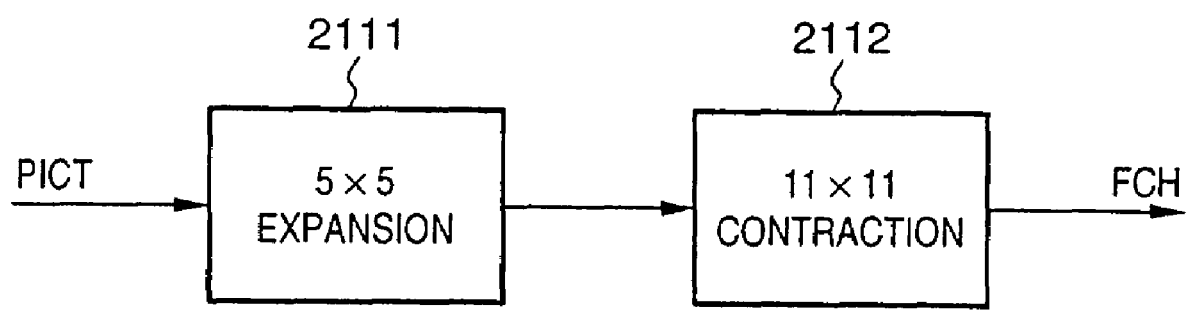
FIG. 19 is a diagram showing the algorithm for character detection in a dot pattern/halftone image.
Figure 20:
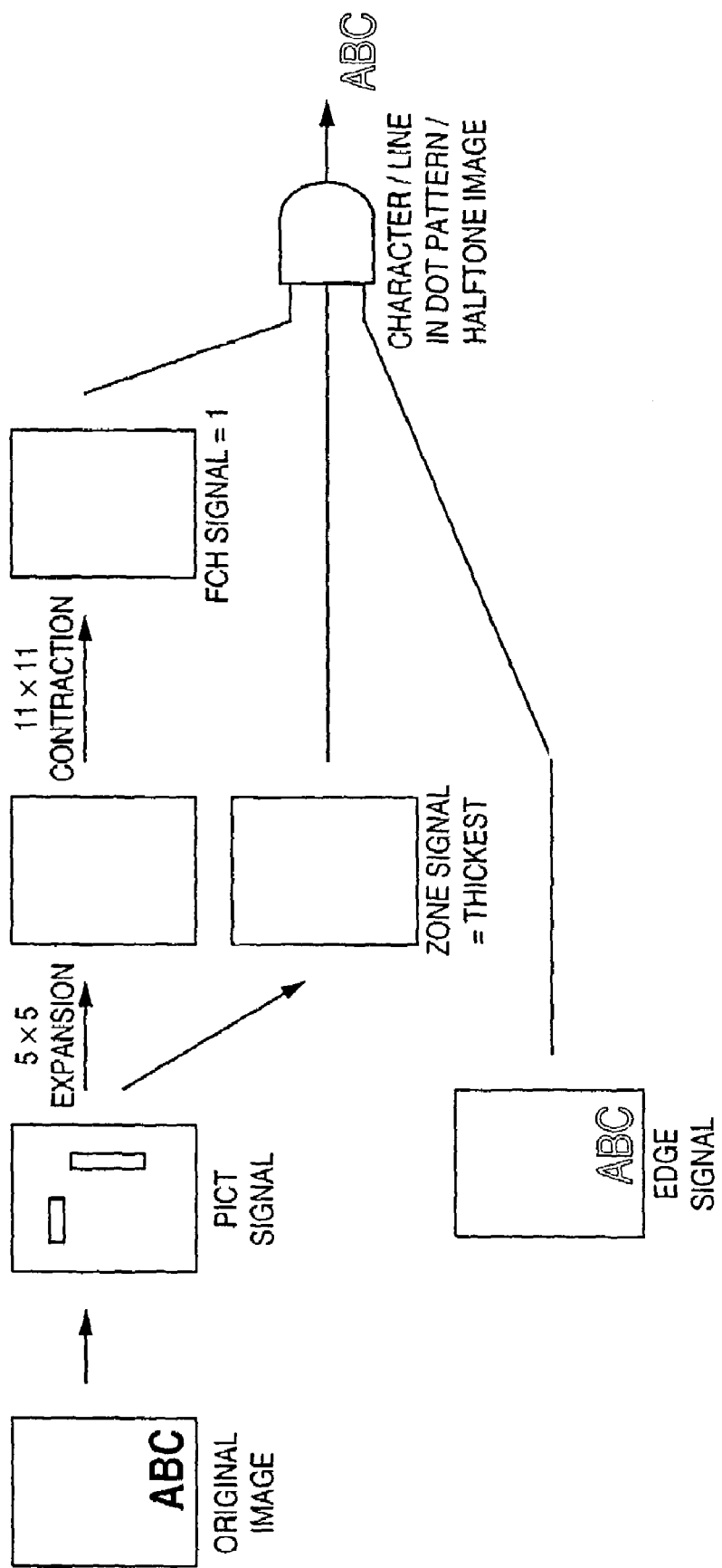
FIG. 20 is a diagram showing processes until an FCH signal is generated.

FIG. 17 is an explanatory view of the processes for determining the output signal PICT_FH. As shown in FIG. 17, for example, when the signal PICT has a width of 26 pixels and is present in a band pattern, if it undergoes contraction with a size larger than 27 pixels×27 pixels, the output becomes all "0"s; if the signal PICT undergoes contraction with a size smaller than 25 pixels×25 pixels and then undergoes expansion with the corresponding size, a band-like output signal PICT_FH having a width of 30 pixels is obtained. When these output signals PICT_FH are input to an encoder 2083 shown in FIG. 16, an image area signal ZONE_P to which the pixel of interest belongs is obtained. FIG. 18 shows the encode rule of the encoder 2083. With this processing, a picture image or dot pattern image having High signals PICT over a broad area is defined as area 7 (maximum value), and a character or line image smaller (thinner) than the area size maximum value is defined as a multi-valued image area corresponding to its size (thickness). In this embodiment, the signal ZONE consists of 3 bits to express the thickness of a character in eight levels. The thinnest character is indicated by "0", and the thickest character (including an area other than a character) is indicated by "7". FIG. 19 shows the algorithm for character detection in a dot pattern/halftone image. The above-mentioned signal PICT is expanded using a 5×5 block in a process 2111. With this processing, a dot pattern area which is often detected as an imperfect area is corrected. Then, the output signal from the process 2111 is contracted using a 11×11 blocks in a process 2112. A signal FCH obtained by such processing is contracted by three pixels as compared to the signal PICT. FIG. 20 shows the processes until the signal FCH is generated. In FIG. 20, by combining the signal CFH, signal ZONE, and edge signal, the edge in a white background can be discriminated from that in a dot pattern/halftone image, and black character processing can be done without emphasizing the dot pattern component even in a dot pattern image or without processing a portion such as a picture edge which does not require any black character processing.

<Operation of LUT 111 Shown in FIG. 3>

As shown in FIG. 3, the signals edge, col, and zone respectively detected, determined, and discriminated by the edge detector 108, saturation determination unit 109, and thickness discrimination circuit 110 output a signal sen in accordance with the LUT 111. The feature of this LUT 111 is to change the printer resolution for only the edge portion of the thinnest character.

<Operation of Smoothing Circuit 104 Shown in FIG. 3>

The operation of the smoothing circuit 104 shown in FIG. 3 will be explained below.

Figure 21:
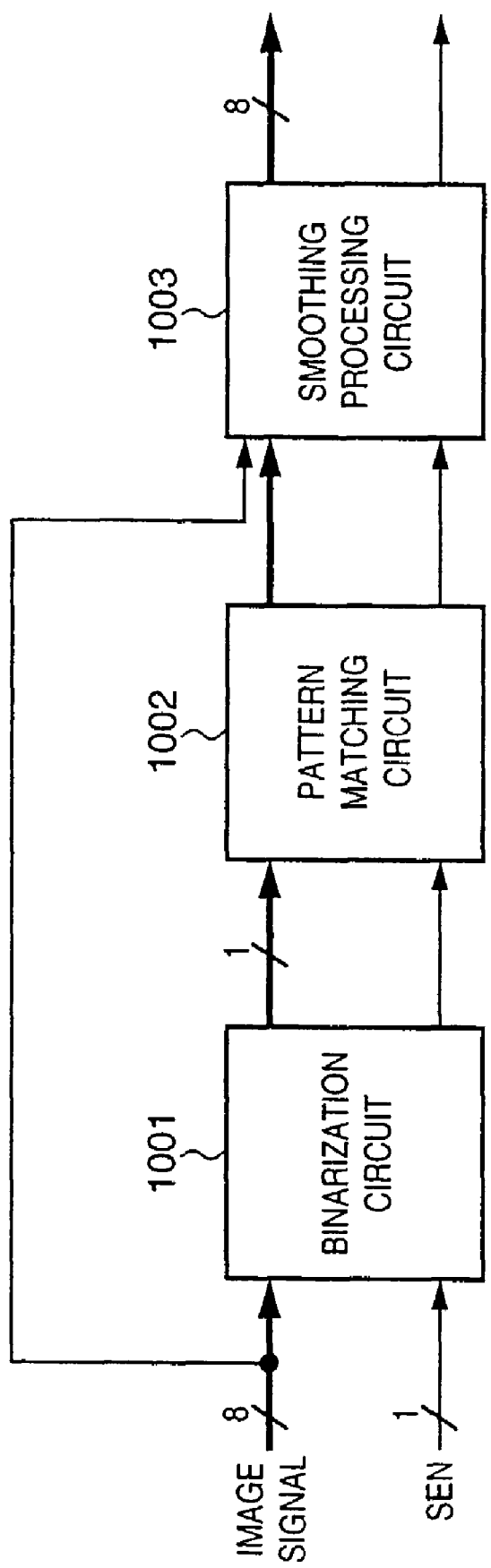
FIG. 21 is a block diagram showing the detailed arrangement of a smoothing circuit 104 shown in FIG. 3.

FIG. 21 shows the detailed arrangement of the smoothing circuit 104 shown in FIG. 3. In FIG. 21, C, M, Y, and K color component signals are frame-sequentially transferred as an image signal, and the following processing is done in units of color components. A binarization circuit 1001 binarizes the input signal for the next pattern matching. A pattern matching circuit 1002 performs pattern matching based on the binary signal. A smoothing processing circuit 1003 smoothes staircasing patterns using data with a resolution twice the original resolution. Note that the data to be substituted by interpolation is determined by checking the density data of surrounding pixels.

Figure 22:
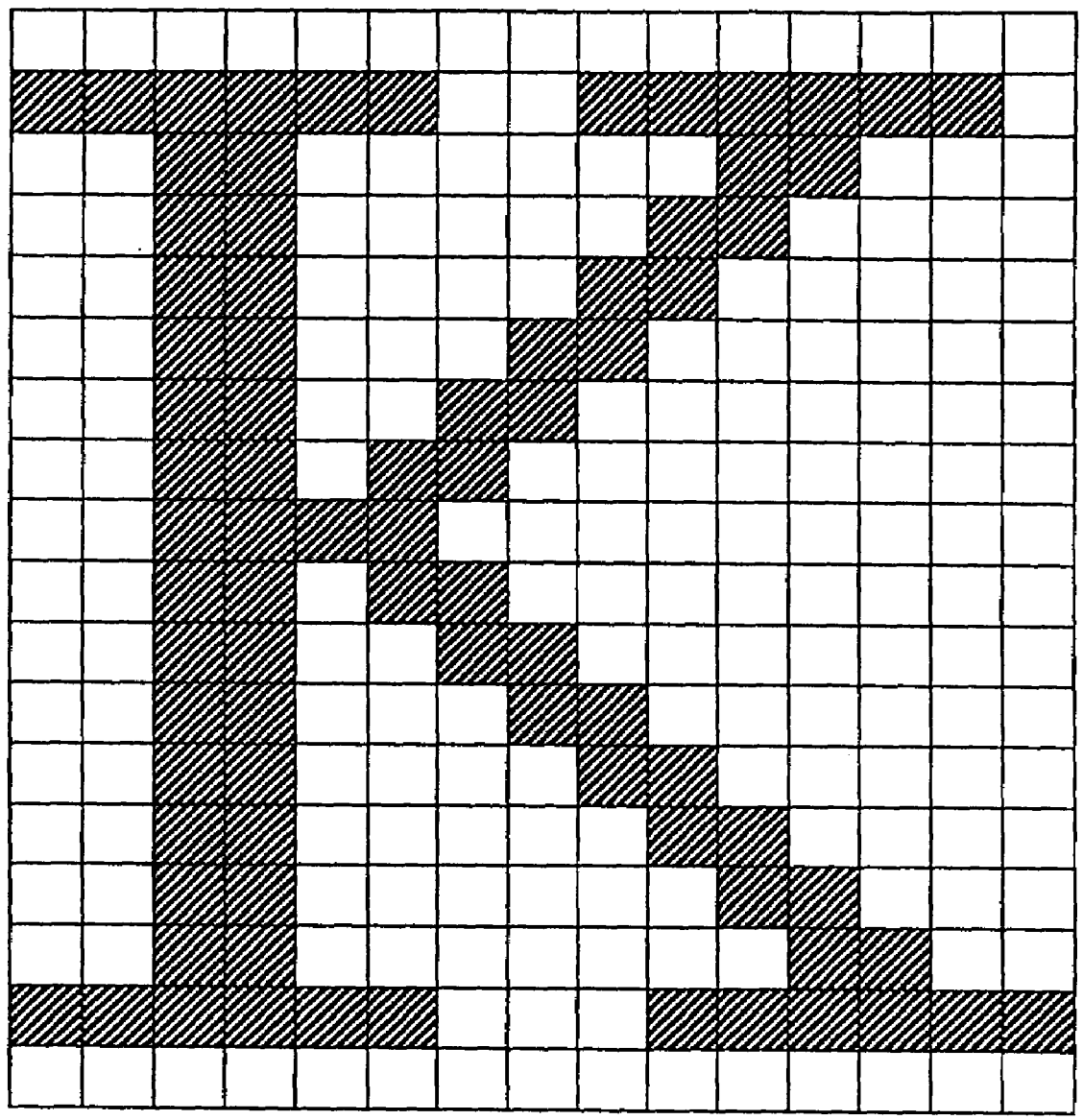
FIG. 22 shows an example of an actually input image signal.
Figure 23:
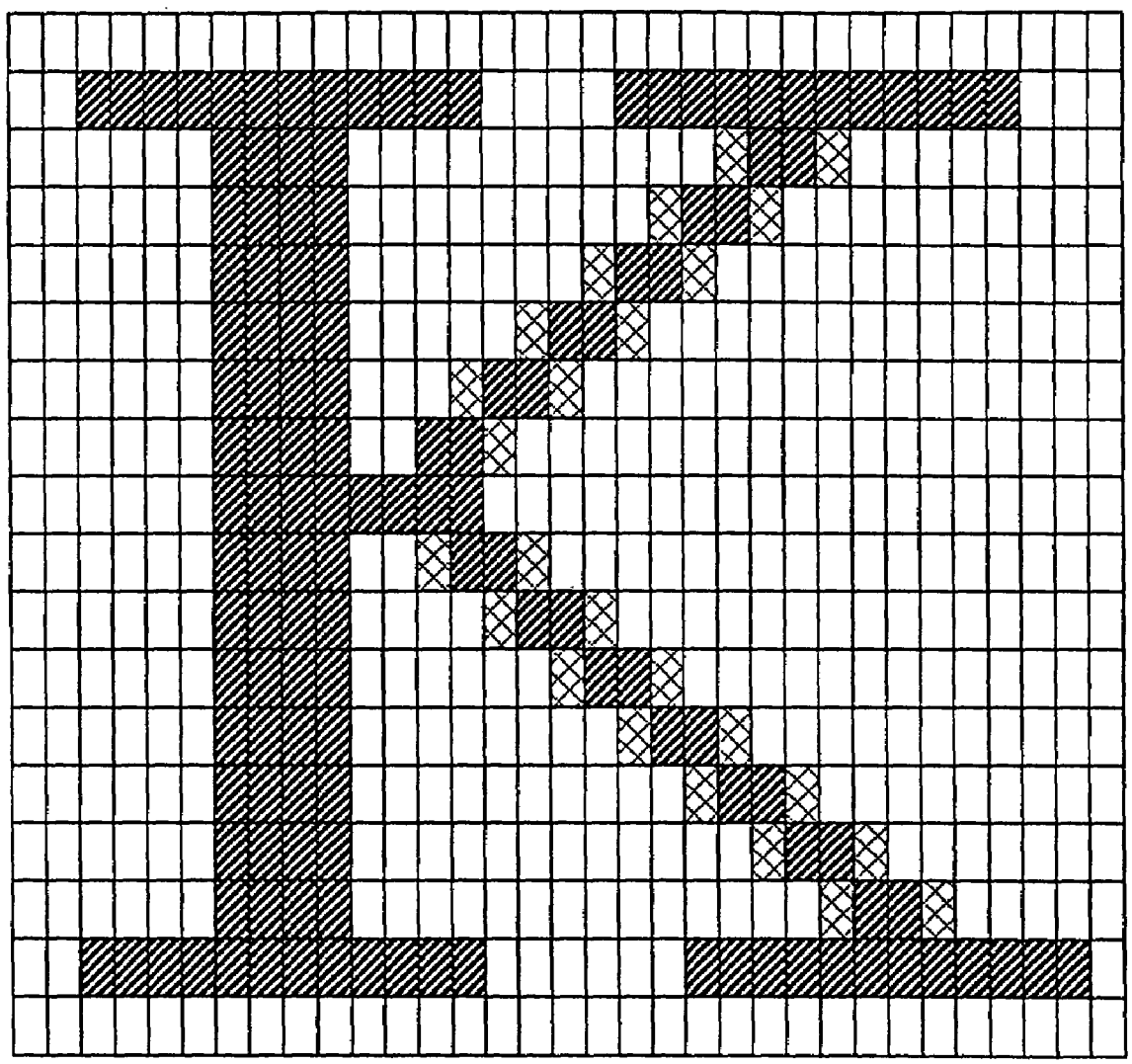
FIG. 23 shows the smoothing result of the image signal shown in FIG. 22.

FIG. 22 shows an example of the actually input image signal, and FIG. 23 shows the smoothing result of the image signal shown in FIG. 22. Note that the area to be smoothed is the thinnest edge portion detected based on the image area separation result.

Figure 24:
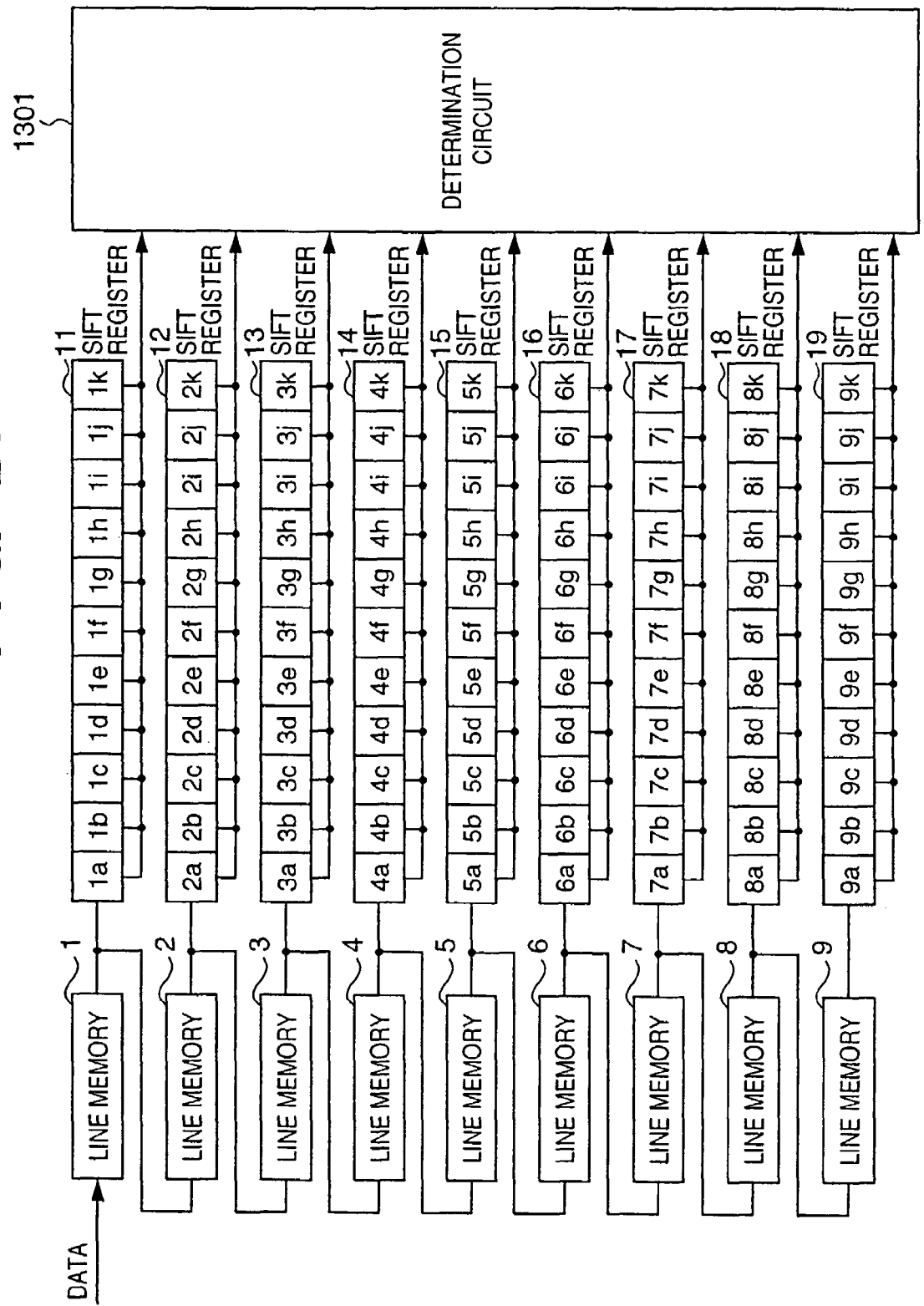
FIG. 24 is a block diagram showing the detailed arrangement of a pattern matching circuit 1002 shown in FIG. 21.

The detailed arrangements of the circuits show in FIG. 21 will be explained below. As shown in FIG. 21, the binarization circuit 1001 binarizes by extracting bit ORs of the input multi-valued image using an OR gate (not shown). As shown in FIG. 24, in the pattern matching circuit 1002, upon reception of image data having a resolution of 400 dpi in synchronism with image clocks CLK, the image data is stored in line memories 1 to 9, and at the same time, shift registers 11 to 19 pick up dot matrix data of 11 dots (main scanning direction)×9 dots (sub-scanning direction) from dot data in line memories 1 to 9. After that, a determination circuit 1301 detects the feature of that dot matrix data. Various pattern matching methods have been proposed, and this embodiment uses such methods. Hence, a detailed description of pattern matching will be omitted.

Figure 25:
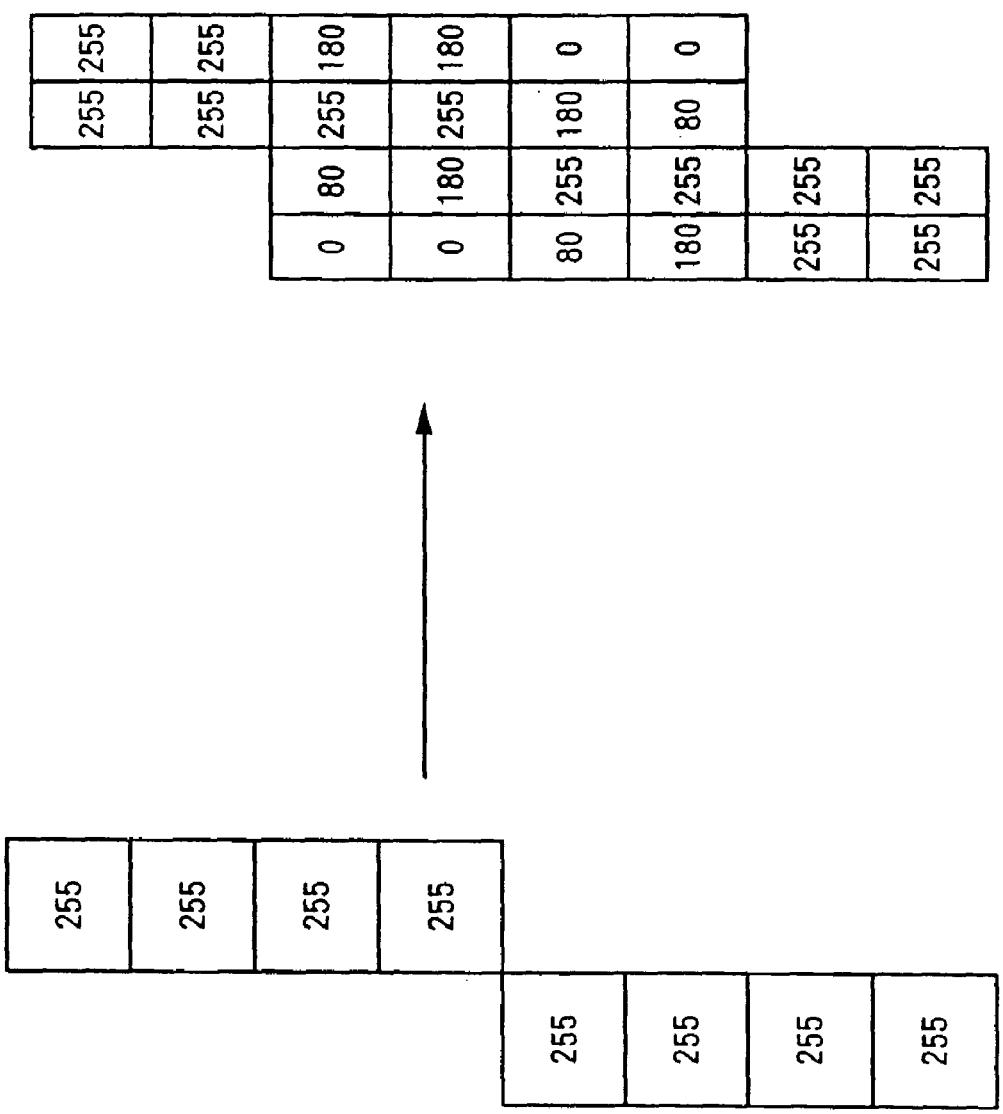
FIG. 25 is a view for explaining an example of smoothing rasterized density data 255 in a line having one pixel width.

The smoothing circuit 1003 will be explained below. FIG. 25 is a view for explaining an example of smoothing rasterized density data 255 in a line having one pixel width. As shown in FIG. 25, the interpolation amount of image data is replaced by multi-valued data in correspondence with the input pattern. Furthermore, since the input image signal is data having multi-valued gradation characteristics, it is not always data 0 or 255. Hence, as shown in FIG. 26, the multi-valued pattern of the input image signal is checked using a 3×3 window. That is, the number of data other than 0 is counted within the 3×3 window, and the average value of the data other than 0 is calculated to obtain data to be smoothed by a linear calculation, thus attaining data interpolation. A data interpolation example will be explained below.

According to FIG. 26, the number of data other than 0 in the 3×3 window is 3. That is, if the density data of these pixels is 51, we have:

$$(51 \times 3)/3 = 51 \tag{6}$$

$$180 \times 51/255 = 60 \tag{7}$$

Hence, if the value to be substituted in FIG. 25 is 180 in equation (7), data "60" is consequently obtained by interpolation in correspondence with the pattern from equation (7).

To restate, according to the first embodiment, even when a raster image from the external equipment or the image read by the image scanner module 201 is input in units of Y, M, C, and K color components, density interpolation is executed in correspondence with every image patterns of characters, lines, and the like, thus allowing smoother smoothing and improving the quality of characters and figures.

Since a multi-color, multi-valued image is smoothed in units of color components, staircasing of color characters and line images even in a gradation image can be eliminated, thus improving the image quality.

[Second Embodiment]

An image processing system of the second embodiment will be explained below.

Figure 27:
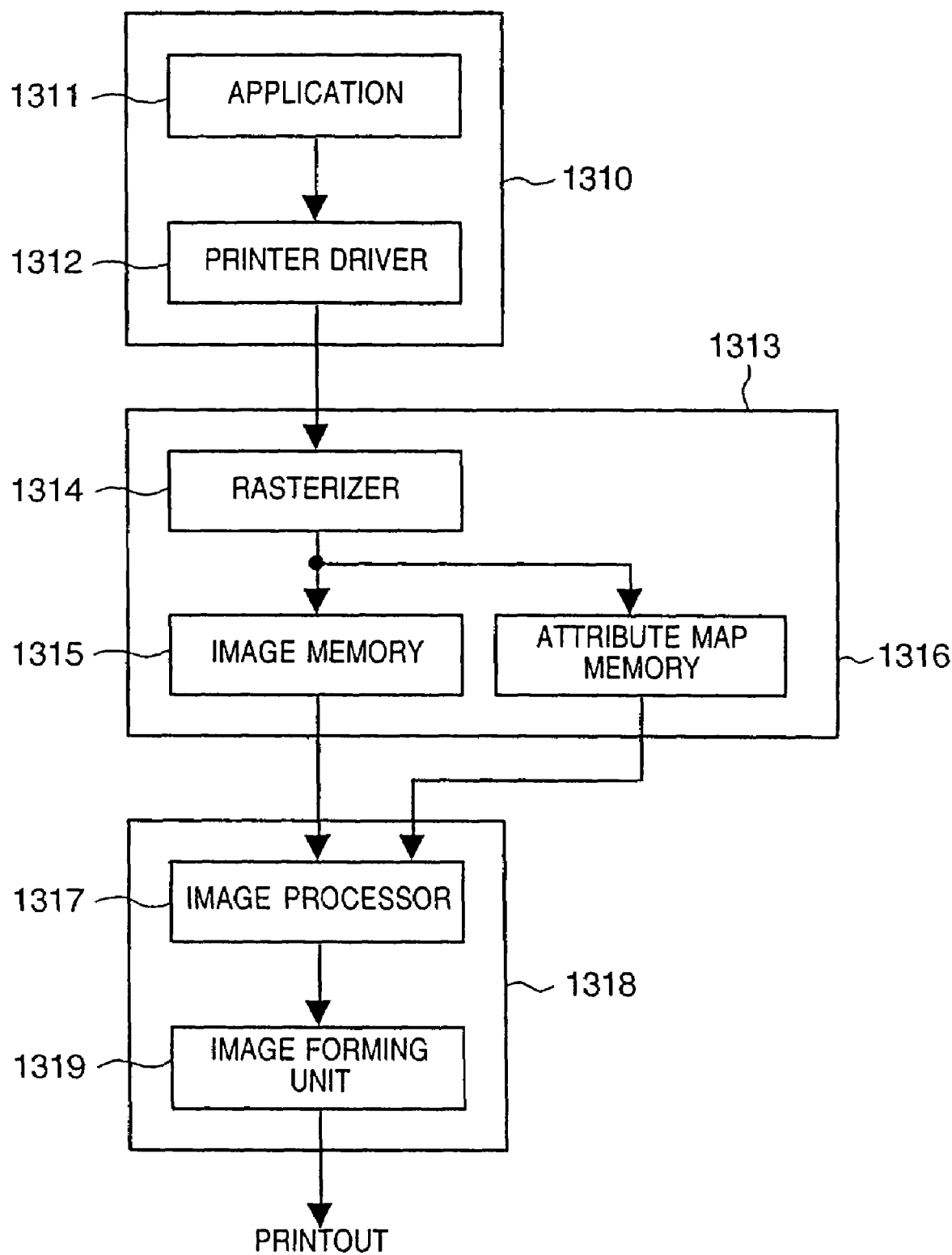
FIG. 27 is a block diagram showing an image processing system according to the second embodiment of the present invention.

FIG. 27 is a block diagram showing an image processing system of the second embodiment.

Figure 32:
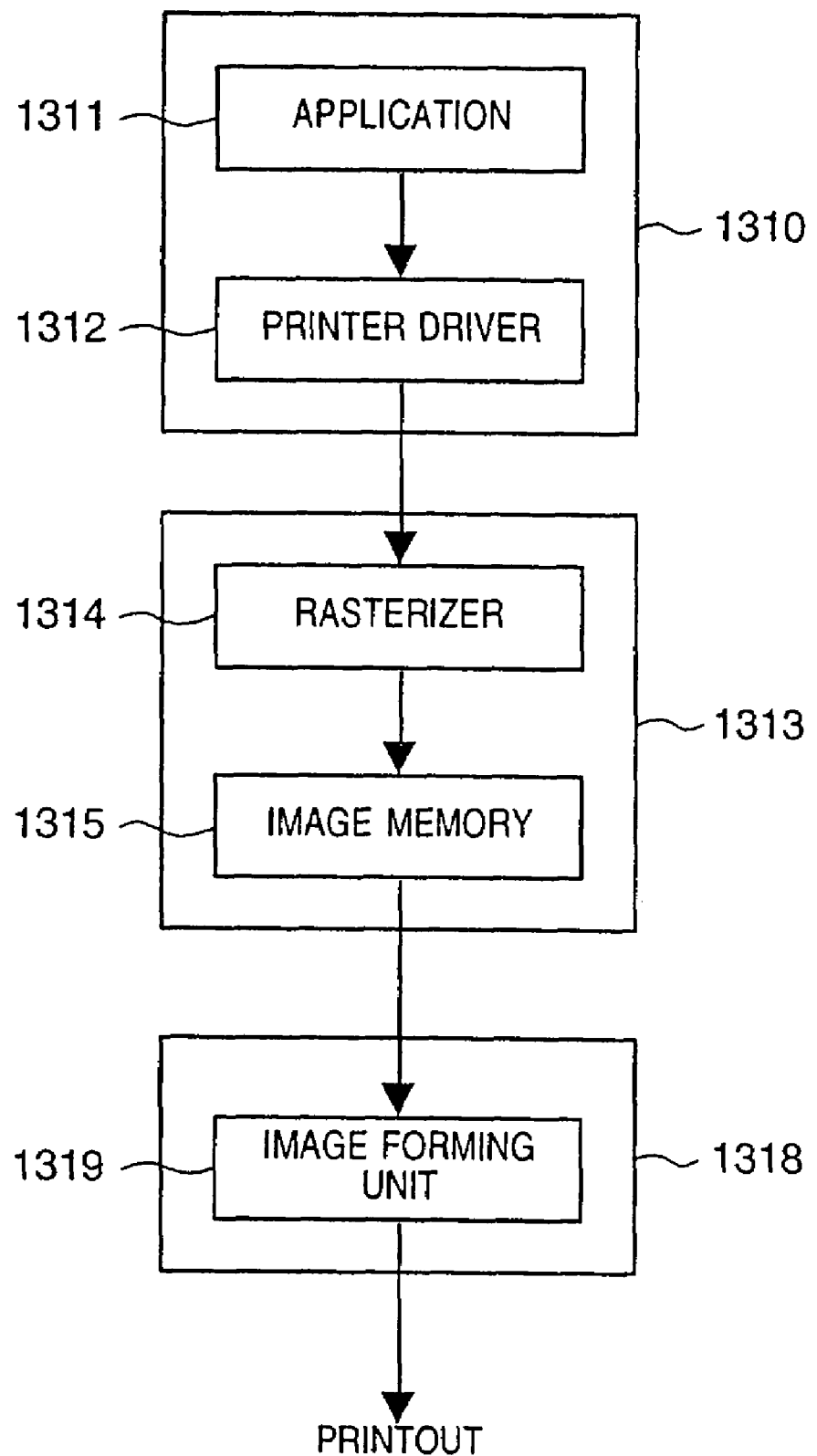
FIG. 32 is a block diagram showing a conventional image processing system.

In FIG. 27, reference numerals 1310 to 1315, 1318, and 1319 denote the same parts as those in FIG. 32 above, and a detailed description thereof will be omitted.

In FIG. 27, the characteristic feature of the second embodiment lies in that an attribute map memory 1316 is added to a raster image processor 1313, and an image processor 1317 is added to a color printer 1318.

A rasterizer 1314 generates attribute map information by a method to be described later on the basis of object attributes and the generated bitmap image upon generating the bitmap image on an image memory 1315 on the basis of commands corresponding to individual objects that form an image. More specifically, the rasterizer 1314 generates attribute map information on the basis of attributes of commands that represent the objects, and the bitmap image generated to be written in the image memory 1315. Note that the contents on the image memory 1315, that have already been mapped to a bitmap image can be referred to. The image processor 1317 of the color printer 1318 performs various kinds of image processing for the bitmap image on the image memory 1315, and outputs bitmap data to an image forming unit 1319. Also, the image processor 1317 appropriately switches the image processing method with reference to attribute information on the attribute map memory 1316.

The method of generating attribute information will be described in detail below.

Figure 28:
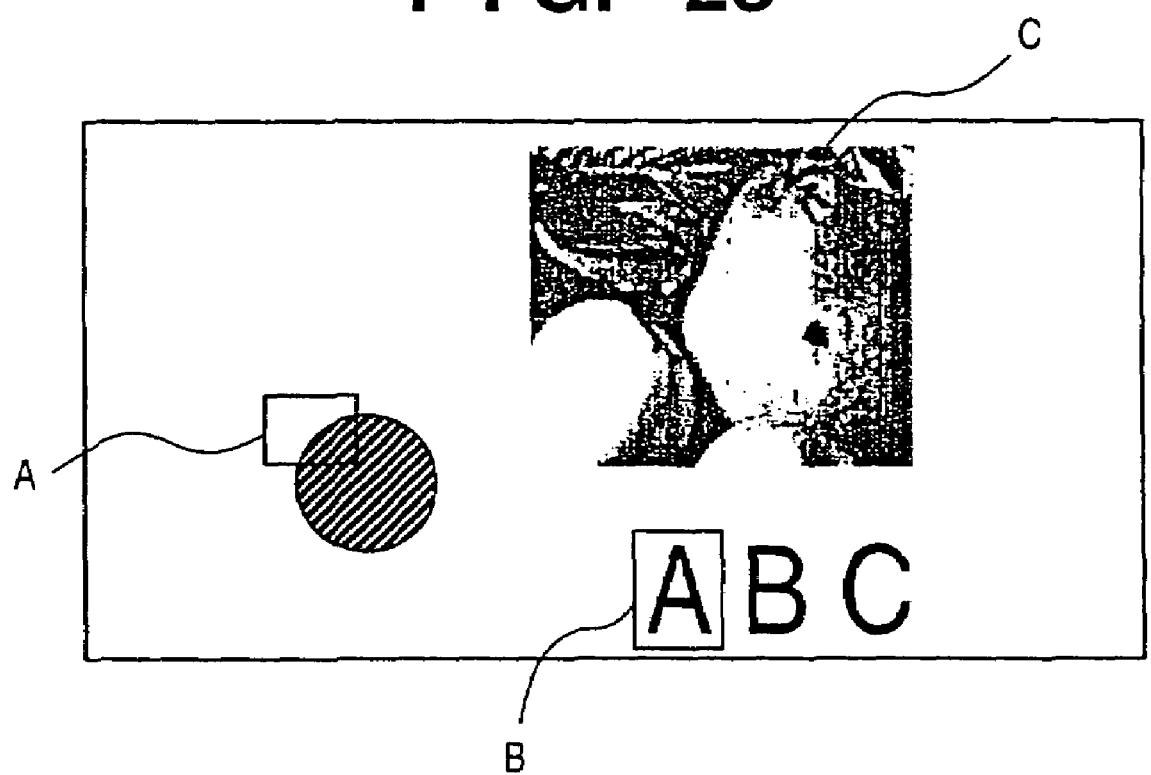
FIG. 28 is a view showing image data mapped on an image memory 1315 in FIG. 27.

FIG. 28 shows image data mapped on the image memory 1315 in FIG. 27. FIGS. 29A to 29E are enlarged views of portion A in FIG. 28, i.e., showing the method of generating a bitmap image on the basis of a command for drawing a circular image. FIGS. 30A to 30E are enlarged views of portion B in FIG. 28.

FIG. 29A shows bitmap data to be written in the image memory 1315; pixel values in units of micro-pixels are two-dimensionally arranged as, e.g., 8-bit integer values.

FIGS. 29B to 29E show attribute information to be written in the attribute map memory 1316. For example, four different attribute information flags, i.e., vector, character, edge, and edge boundary flags are generated in units of bits (binary data "0" or "1") in the same pixel matrix as that of the bitmap data on the image memory 1315.

In FIG. 29A, 0 represents a white micro-rectangle, and 1 represents a black micro-rectangle. In FIG. 29B, a vector flag is set at "1" in a vector image area such as a character, graphic, or the like, and is set at "0" in other areas, e.g., a background portion and continuous gradation picture portion (see portion C in FIG. 28). Hence, all the vector flags inside the circular image in FIG. 29B are set at "1". The vector flag shown in FIG. 29B can be normally generated on the basis of a command for drawing a circle. Also, since this embodiment refers to the contents of FIG. 29A, a new painted area can be detected to obtain vector flags "1" in FIG. 29B in that area.

A character flag shown in FIG. 29C is set at "1" in a character area, and is set at "0" in other areas. Since the circle is not a character, all character flags are set at "0". An edge flag shown in FIG. 29D is set at "1" at the boundary portion of a circular object.

An edge flag is set at "1" at the position of the pixel, the vector flag of which is detected to change from "0" to "1". An edge boundary flag in FIG. 29E is set at "1" at a pixel position that neighbors the edge flag.

The edge boundary flag is generated at both the inside and outside an edge, as shown in FIG. 29E, by detecting four neighboring pixels of a pixel, the edge flag of which is "1", and setting "1" at those pixel positions.

On the other hand, in some cases, only pixels outside an edge are preferably set at "1" depending on the image processing contents. In such case, edge boundary flags are inhibited from being generated on the halftone portion (an area indicated black) inside the circle by referring to the original image memory simultaneously with the edge flags shown in FIG. 29D.

FIGS. 30A to 30E show a case wherein attribute map information is generated for a character object.

Figure 30A:
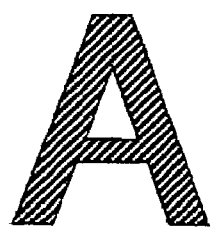
FIGS. 30A to 30E are enlarged views of portion B in FIG. 28.
Figure 30B:
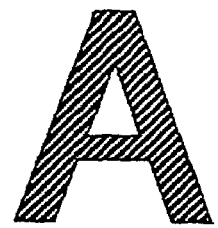
Figure 30C:
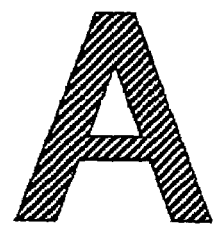
Figure 30D:
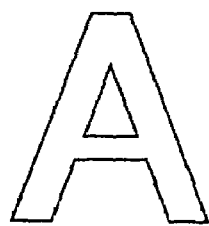
Figure 30E:
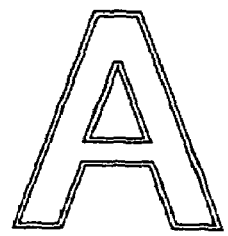

The meanings of FIGS. 30A to 30E are the same as those of FIGS. 29A to 29E, and the types of attribute information generated are substantially the same as those in FIGS. 29B to 29E, except for a character flag in FIG. 30C. This is because the target image is a character object, and character flags inside the entire character are set at "1".

The attribute map information is generated in the above-mentioned procedure. In the continuous gradation image area shown in FIGS. 29A to 30E and a background area where no image is drawn, all the flags are set at "0".

The bitmap image data on the image memory 1315 and attribute information on the attribute map memory 1316 are transferred to the image processor 1317 together with sync signals (not shown). At this time, a bitmap image corresponding to a predetermined pixel position on the image memory 1315, and attribute information of that pixel are transferred in correspondence with each other. That is, when the pixel value of a specific pixel in the image memory 1315 is transferred to the image processor 1317, attribute information (flag data) of that pixel is nearly simultaneously transferred.

The image processor 1317 shown in FIG. 27 will be described below.

Figure 31:
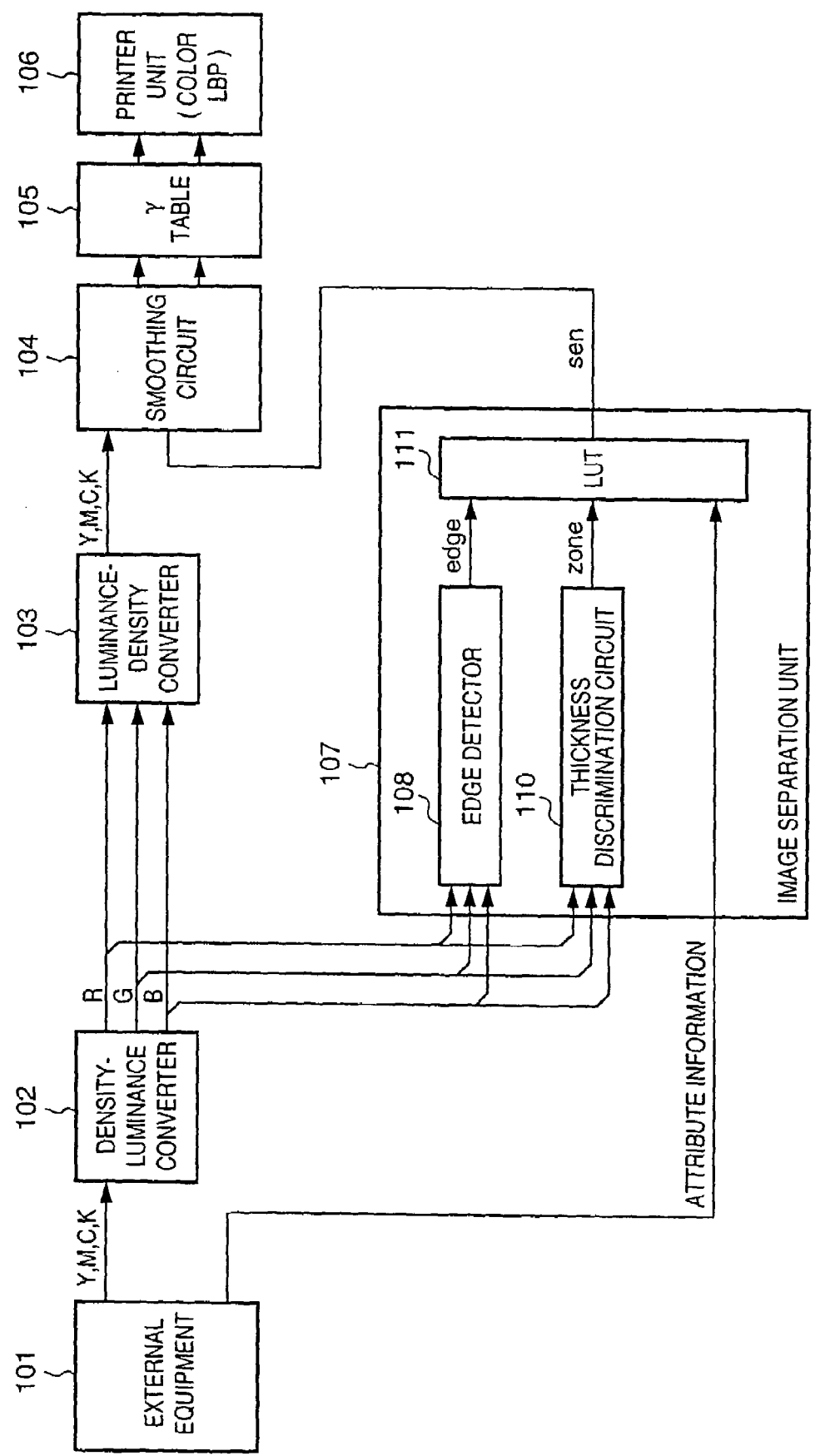
FIG. 31 is a block diagram of an image processor 1317 shown in FIG. 27.

FIG. 31 is a block diagram of the image processor 1317 shown in FIG. 27.

In FIG. 31, image signals Y, M, C, and K according to the above-mentioned bitmap data output from an external equipment 101 are sequentially transferred in units of scanning frames in a printer unit 106, and a density-luminance converter 102 converts density signals Y, M, C, and K into luminance signals R, G, and B using a look-up table ROM in units of colors.

A luminance-density converter 103 converts three primary color signals R, G, and B transferred from the density-luminance converter 102 into density signals Y, M, C, and K, and frame-sequentially outputs the density signals to have a predetermined bit width (8 bits).

A smoothing circuit 104 generates data having a resolution twice the reading resolution in accordance with a 400/800-line switching signal (sen signal) as a result of an image area separation unit 107, as in the first embodiment. A γ table 105 converts the resolution-converted density data in correspondence with the gradation reproduction characteristics of the printer. The processed image signals M, C, Y, and K and the sen signal serving as a 400/800-line switching signal are sent to the laser driver, and the printer unit 106 performs density recording by PWM.

The image area separation unit 107 has an edge detector 108, thickness discrimination circuit 110, and look-up table (LUT) 111. The edge detector 108 generates an edge signal edge from image signals R, G, and B output from the density-luminance converter 102, and outputs it to the LUT 111. The thickness discrimination circuit 110 generates a thickness signal zone from image signals R, G, and B output from the density-luminance converter 102, and outputs it to the LUT 111.

<Operation of LUT 111 Shown in FIG. 31>

The operation of the LUT 111 shown in FIG. 31 will be explained below.

As shown in FIG. 31, the LUT 111 outputs a sen signal in accordance with the signals edge and zone output from the edge detector 108 and thickness discrimination circuit 110, and attribute information output from the external equipment 101, and the printer can perform appropriate processing in accordance with the types of objects of a PDL image.

The features of the LUT 111 are:

Multi-valued black character processing can be made in correspondence with the thickness of a character (for example, in case of a thick character, an 800-line signal is used near an edge as compared to the interior of a character, so as to further emphasize the edge, i.e., the character).

Since a plurality of edge area ranges are prepared, a black character processing area (i.e., an area for which an 800- or 400-line signal is used) can be selected in correspondence with the thickness of a character.

A character in a dot pattern/halftone image can be processed differently from that on a white background.

The printer resolution is changed only for the thinnest character (e.g., the number of lines increases for thin characters to increase the resolution).

Of course, in addition to the above-mentioned processing, various combinations of processing can be done for the input signal.

Since the operations of the edge detector 108 and thickness discrimination circuit 110 are the same as those in FIG. 3, a detailed description thereof will be omitted.

To recapitulate, according to the second embodiment, adaptive processing is executed for bitmap data which is generated from commands representing an image using the attributes of objects that form the image, and the features of bitmap data, so as to reduce determination errors produced when adaptive processing is made using only the features of bitmap data. Furthermore, upon improving the image quality, since the number of lines upon interpolation, smoothing, and image formation is controlled, staircasing at the edge portion of, e.g., a character object, can be reduced, and a high-resolution image can be provided.

[Third Embodiment]

Figure 33:
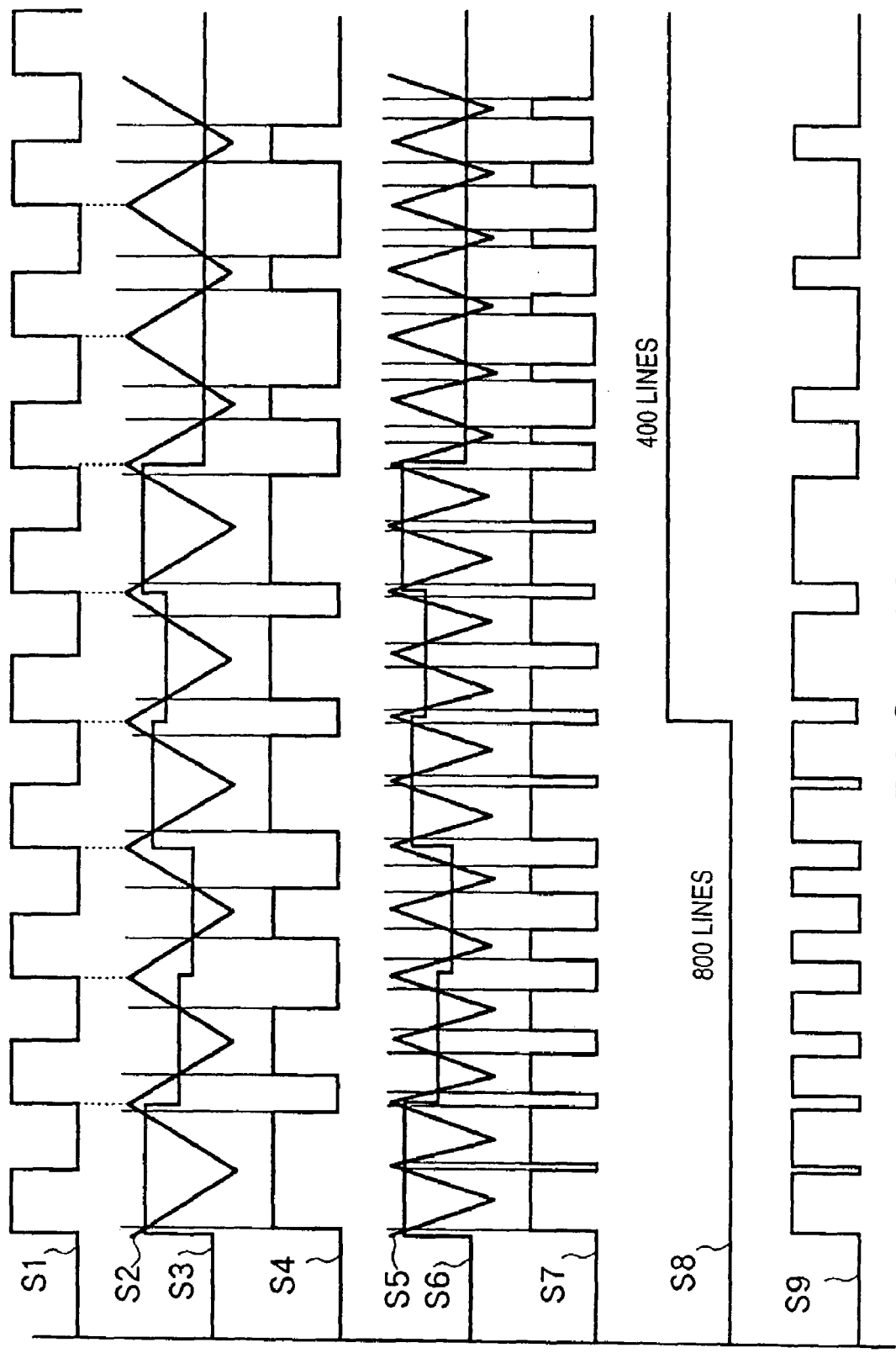
FIG. 33 is a timing chart showing the control for density reproduction of a printer according to the third embodiment of the present invention.

FIG. 33 is a timing chart showing the control for density reproduction of a printer according to the second embodiment.

In FIG. 33, a signal S1 is a printer pixel clock signal corresponding to a resolution of 400 dpi. The printer pixel clock signal S1 is generated by the laser driver 212. A 400-line triangular wave S2 is generated in synchronism with the printer pixel clock signal S1. The period of the 400-line triangular wave S2 is the same as that of the printer pixel clock signal S1.

256-gradation (8-bit) M, C, Y, and BK image data transferred from the image processing unit 209 shown in FIG. 1, and a line number switching signal S8 for switching 400 lines/800 lines are synchronized with the printer pixel clock signal S1 by a FIFO memory (not shown) in the laser driver 212, and are transferred in synchronism with the printer pixel clock signal S1.

8-bit digital image data is converted into an analog image signal S3 by a D/A converter. The analog image signal S3 is compared with the above-mentioned 400-line triangular wave S2 in an analog manner to generate a 400-line PWM output S4. More specifically, the 400-line triangular wave S2 modulates the pulse width of the analog image signal S3 at a resolution of 400 dpi.

Digital pixel data changes from 00H to FFH, and the 400-line PWM output S4 has a pulse width corresponding to this value. One period of the 400-line PWM output S4 is 63.5 μm on the photosensitive drum.

The laser driver 212 generates an 800-line triangular wave S6 having a period twice that of the printer pixel clock signal S1 in synchronism with the signal S1, in addition to the 400-line triangular wave S2.

Then, an 800-line PWM output signal S7 is generated by comparing the 800-line triangular wave S6 and 400-dpi analog image signal S3. That is, the 800-line triangular wave S6 modulates the pulse width of the analog image signal S3 at a resolution of 800 dpi.

The resolution other than 400 and 800 dpi can be set, and in such case, the period of the triangular wave is changed appropriately.

The 800-line PWM output signal S7 forms a latent image on the photosensitive drum at a period of 31.75 μm, as shown in FIG. 33.

Upon comparing 800-line density reproduction with 400-line density reproduction, 800-line density reproduction that reproduces density in units of 31.75 μm is more suitable for recording high-resolution images than 400-line density reproduction that reproduces density in units of 63.5 μm. On the other hand, 400-line density reproduction is suitable for recording an image that places an importance on gradation.

As described above, recording by the 400-line PWM output signal S4 is suitable for gradation reproduction, and recording by the 800-line PWM output signal S7 is excellent in terms of resolution. For this reason, the 400- and 800-line PWM output signals S4 and S7 are appropriately selectively output in correspondence with the features of image data such as characters, figures, and the like.

When the line number switching signal S8 is Low level, the 800-line PWM output signal S7 is selected; when it is High level, the 400-line PWM output signal S4 is selected.

[Circuit Arrangement]

Figure 34:
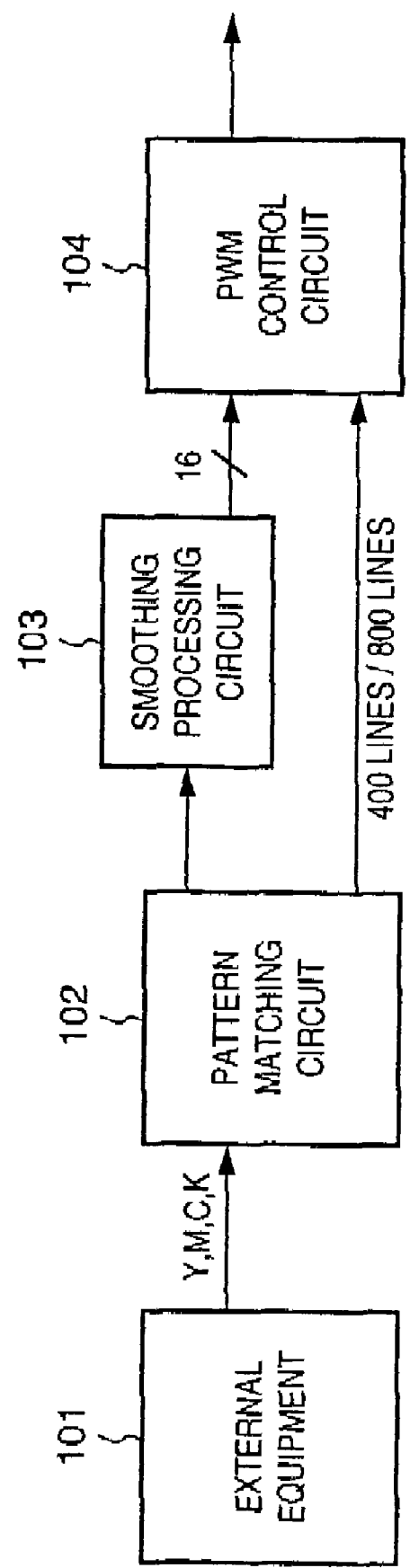
FIG. 34 is a block diagram showing the detailed arrangement of the image processing unit 209 shown in FIG. 1.

The control circuit arrangement for density reproduction of the printer will be explained below with reference to FIG. 34 FIG. 34 shows the control circuit arrangement for density reproduction of the printer.

In FIG. 34, a bitmap image signal output from an external equipment 101 such as a personal computer is subjected to pattern matching in a pattern matching circuit 102. When the input image signal matches a given pattern in the pattern matching circuit 102, "0" is output as the line number switching signal S8 shown in FIG. 33; when the input image signal does not have a matching pattern, "1" is output. A smoothing processing circuit 103 smoothes staircasing patterns using data with a resolution twice the original resolution. Note that the data to be substituted by interpolation is determined by checking the density data of surrounding pixels. A PWM control circuit 104 switches the resolution in correspondence with the line number switching signal S8.

FIG. 22 shows an example of the actually input image signal, and FIG. 23 shows the smoothing result of the image signal shown in FIG. 22. Note that the portion to be smoothed is only an edge portion detected based on the image area separation result.

The detailed arrangements of the circuits shown in FIG. 34 will be described below.

In the pattern matching circuit 102 shown in FIG. 34, as shown in FIG. 24, upon reception of image data having a resolution of 400 dpi in synchronism with image clocks CLK, the image data is stored in line memories 1 to 9, and at the same time, shift registers 11 to 19 pick up dot matrix data of 11 dots (main scanning direction)×9 dots (sub-scanning direction) from dot data in line memories 1 to 9. After that, a determination circuit 1301 detects the feature of that dot matrix data. Various pattern matching methods have been proposed, and this embodiment uses such methods. Hence, a detailed description of pattern matching will be omitted.

FIGS. 35A and 35B are views for explaining the algorithm for extracting the feature of a dot pattern over the entire matrix area of 11 dots (main scanning direction)×9 dots (sub-scanning direction) and discriminating whether or not the dot pattern is to be smoothed.

FIG. 35A shows a reference area of 11 dots (main scanning direction)×9 dots (sub-scanning direction), and expresses 99 pixels in a matrix of a, b, c, d, e, f, g, h, i, j, and k in the main scanning direction, and 1, 2, 3, 4, 5, 6, 7, 8, and 9 in the sub-scanning direction. For example, the central pixel is expressed by "5$f$". FIG. 35B shows the state wherein the reference area shown in FIG. 35A is divided into 17 groups X1 to X8, Y1 to Y8, and 5$f$. In FIG. 35B, the central pixel 5$f$ is selected as the pixel to be changed for smoothing.

In FIG. 35B, the groups are similarly formed so that group X1 includes pixels 3$d$, 3$e$, 3$f$, 4$d$, 4$e$, and 4$f$, group X2 includes pixels 3$f$, 3$g$, 3$h$, 4$f$, 4$g$, and 4$h$, group X3 includes pixels 6$d$, 6$e$, 6$f$, 7$d$, 7$e$, and 7$f$, and so forth. These groups can be classified into eight groups (X1 to X8) consisting of six dots, six groups (Y1, Y3 to Y5, Y7, and Y8) consisting of nine dots, two groups (Y2 and Y6) consisting of 10 dots, and the central pixel 5$f$.

Note that the feature of each group is expressed by Xn or Yn. When all dots in a certain group are the same, the feature of that group is represented by "0". On the other hand, when dots in a certain group are different from each other, the feature of that group is represented by "1". With this procedure, features X1 to X8 and Y1 to Y8 of the groups are obtained. Based on the obtained pattern matching result, the smoothing processing circuit 103 two-divisionally substitutes a predetermined density for a predetermined pattern.

The smoothing processing circuit 103 will be explained below.

As shown in FIG. 25, the interpolation amount of image data is replaced by multi-valued data in correspondence with the input pattern. Furthermore, since the input image signal is data having multi-valued gradation characteristics, it is not always data 0 or 255. Hence, as shown in FIG. 26, the multi-valued pattern of the input image signal is checked using a 3×3 window. That is, the number of data other than 0 is counted within the 3×3 window, and the average value of the data other than 0 is calculated to obtain data to be smoothed by a linear calculation, thus attaining data interpolation. A data interpolation example will be explained below.

According to FIG. 26, the number of data other than 0 in the 3×3 window is 3. That is, if the density data of these pixels is 51, we have equations (6) and (7) above. Hence, if the value to be substituted in FIG. 25 is 180 in equation (7), data "60" is consequently obtained upon interpolation in correspondence with the pattern from equation (7).

To restate, according to the third embodiment, even when a raster image is input from the external equipment in units of Y, M, C, and K color components, density interpolation is executed in correspondence with every image patterns of characters, lines, and the like, thus allowing smoother smoothing and improving the quality of characters and figures.

As described above, according to the third embodiment, when image data such as a character or the-like which places an importance on resolution is to be processed, the edge of the character or the like can be smoothed to increase resolution. On the other hand, when image data which places an importance on gradation characteristics is to be processed, it can be directly output without increasing the resolution.

[Fourth Embodiment]

In the first to third embodiments, when it is determined as a result of pattern matching corresponding to the image characteristics that the resolution is to be converted, density interpolation is implemented at a resolution having a larger value (e.g., twice) the reading resolution. In order to further increase the resolution and to remove staircasing, data may be interpolated at a resolution N times (N is a natural number) the reading resolution.

[Other Embodiments]

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Figure 36:
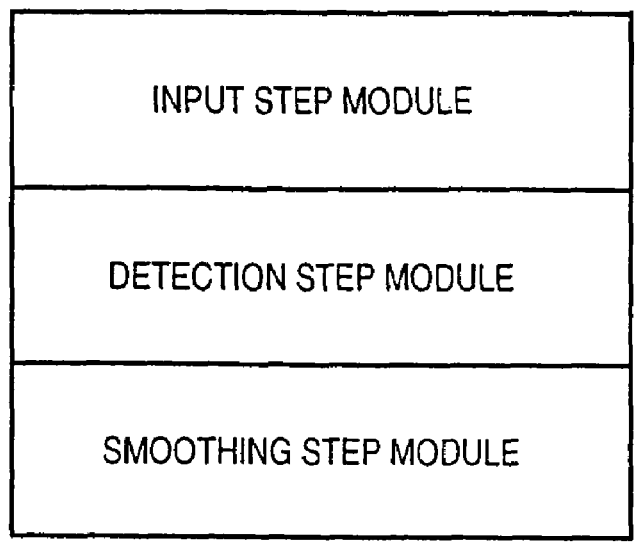
Figure 37:
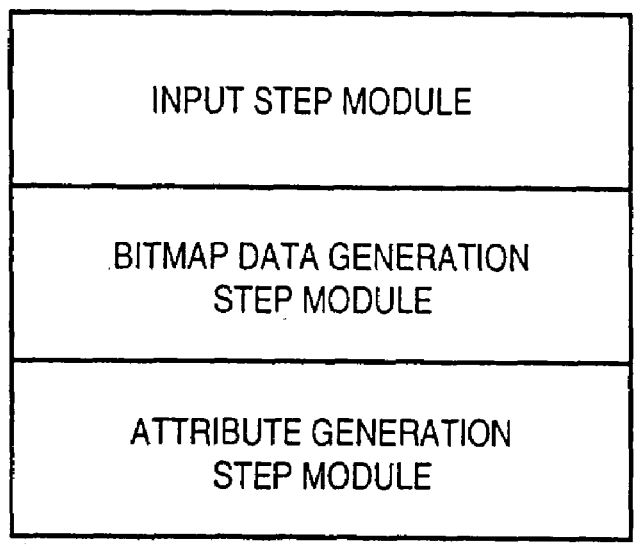

When the present invention is applied to the storage medium, the storage medium stores program codes corresponding to the above-mentioned flow chart. In this case, modules shown in memory map examples in FIGS. 36 to 38 are stored in the storage medium.

That is, program codes of at least an "input step module", a "detection step module", and a "smoothing step module" can be stored in the storage medium.

Also, program codes of at least an "input step module", a "bitmap data generation step module", and an "attribute generation step module" can be stored in the storage medium.

Furthermore, program codes of at least an "input step module", a "detection step module", a "smoothing step module", an "output step module", and a "switching step module" can be stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting a command that represents an image;
   bitmap data generation means for generating bitmap data on the basis of the command that represents the image;
   attribute generation means for generating attribute information on the basis of the bitmap data and an attribute of an object that forms an image;
   detection means for detecting an area of the image to be smoothed on the basis of the attribute information; and
   smoothing means for smoothing image data in the area detected by said detection means.

2. The apparatus according to claim 1, further comprising output means that generates a recording signal, a pulse width of which is modulated on the basis of the smoothed image data and a reference signal, and switching means that switches an output resolution by switching the recording signal.

3. The apparatus according to claim 1, wherein said output means modulates the pulse width of the recording signal using at least two reference signals having different periods.

4. The apparatus according to claim 2, wherein said switching means selects one of the two reference signals having different periods.

5. The apparatus according to claim 1, wherein said smoothing means smoothes bitmap image data at a resolution twice a resolution of the image data in the area detected by said detection means.

6. The apparatus according to claim 1, wherein said smoothing means smoothes bitmap image data at a resolution corresponding to a natural number multiple of a resolution of the image data in the area-detected by said detection means.

7. The apparatus according to claim 1, wherein the image data having a plurality of color components is full-color image data which is color-separated into yellow, magenta, cyan, and black components.

8. The apparatus according to claim 1, wherein the image data having a plurality of color components is read from external equipment.

9. The apparatus according to claim 1, wherein said smoothing means generates image data having a resolution twice the resolution of the image data having the plurality of color components by interpolating the image data.

10. The apparatus according to claim 2, wherein said smoothing means generates image data having a resolution corresponding to the natural number multiple of the resolution of the image data having the plurality of color components by interpolating the image data.

11. An image processing method comprising:
    an input step of inputting a command that represents an image;
    a bitmap data generation step of generating bitmap data on the basis of the command that represents the image;
    an attribute generation step of generating attribute information on the basis of the bitmap data and an attribute of an object that forms an image;
    a detection step of detecting an area of the image to be smoothed on the basis of the attribute information; and
    a smoothing step of smoothing image data in the area detected in the detection step.

12. The method according to claim 11, further comprising an output step that includes a step of generating a recording signal, a pulse width of which is modulated on the basis of the smoothed image data and a reference signal, and a switching step that includes the step of switching the output resolution by switching the recording signal.

13. The method according to claim 12, wherein the output step includes a step of modulating the pulse width of the recording signal using at least two reference signals having different periods.

14. The method according to claim 13, wherein the switching step includes a step of selecting one of the two reference signals having different periods.

15. The method according to claim 11, wherein the image data having a plurality of color components is full-color image data which is color-separated into yellow, magenta, cyan, and black components.

16. The method according to claim 11, wherein the image data having a plurality of color components is read from external equipment.

17. A computer-readable memory which stores a program code of image processing, characterized by comprising:
  a code of an input step of inputting a command that represents an image;
  a code of a bitmap data generation step of generating bitmap data on the basis of the command that represents the image;
  a code of an attribute generation step of generating attribute information on the basis of the bitmap data and an attribute of an object that forms an image;
  a code of a detection step of detecting an area of the image to be smoothed on the basis of the attribute information; and
  a code of a smoothing step of smoothing image data in the area detected in the detection step.

18. An image processing apparatus comprising:
  input means for inputting a command that represents an image;
  bitmap data generation means for generating bitmap data on the basis of the command that represents the image;
  attribute generation means for generating attribute information on the basis of the bitmap data and an attribute of an object that forms an image; and
  process means for processing the bitmap data on the basis of the attribute information.

19. The apparatus according to claim 18, wherein the attribute information is generated in correspondence with a two-dimensional coordinate position of the bitmap data, and attribute information at an identical coordinate position with the bitmap data is output in synchronism with the bitmap data.

20. The apparatus according to claim 18, wherein said process means generates image data of which the resolution is improved.

21. The apparatus according to claim 18, further comprising means for generating resolution-improved image data by interpolating a resolution of the bitmap data in accordance with the attribute information.

22. The apparatus according to claim 18, wherein said process means smooths bitmap image data.

23. An image processing method comprising:
  an input step of inputting a command that represents an image;
  a bitmap data generation step of generating bitmap data on the basis of the command that represents the image;
  an attribute generation step of generating attribute information on the basis of the bitmap data and an attribute of an object that forms an image; and
  a process step of processing the bitmap data on the basis of the attribute information.

24. A computer-readable memory which stores a program code of image processing, comprising:
  a code of an input step of inputting a command that represents an image;
  a code of a bitmap data generation step of generating bitmap data on the basis of the command that represents the image;
  a code of an attribute generation step of generating attribute information on the basis of the bitmap data and an attribute of an object that forms an image; and
  a code of a process step of processing the bitmap data on the basis of the attribute information.

* * * * *

UNITED STATES PATENT AND TRADEMARK OFFICE
CERTIFICATE OF CORRECTION

PATENT NO. : 7,142,717 B2 Page 1 of 1
APPLICATION NO. : 10/915090
DATED : November 28, 2006
INVENTOR(S) : Yushi Matsukubo et al.

It is certified that error appears in the above-identified patent and that said Letters Patent is hereby corrected as shown below:

COVER PAGE:
(75) Inventors: "Yushi Matsukubo, Kanagawa (JP); Hiroyuki Tsuji, Kanagawa (JP); Yukihiko Shimizu, Kanagawa (JP)" should read -- Yushi Matsukubo, Yokohama (JP); Hiroyuki Tsuji, Yokohama (JP); Yukihiko Shimizu, Kawasaki (JP) --.

DRAWINGS:
Sheet 24, Figure 24, "SIFT" (all occurrences) should read -- SHIFT --.

COLUMN 7:
Line 48, "read" should read -- red --.

COLUMN 11:
Line 54, "pixels × to" should read -- pixels × --.

COLUMN 12:
Line 63, "show" should read -- shown --.

COLUMN 13:
Line 41, "patterns" should read -- pattern --.

COLUMN 18:
Line 50, "patterns" should read -- pattern --.

COLUMN 20:
Line 9, "output" should read -- an output --;
Line 11, "switching" should read -- a switching --; and
Line 27, "area-detected" should read -- area detected --.

Signed and Sealed this

Twelfth Day of June, 2007

JON W. DUDAS
*Director of the United States Patent and Trademark Office*